(12) United States Patent
Xu et al.

(10) Patent No.: US 11,638,161 B2
(45) Date of Patent: Apr. 25, 2023

(54) ELECTRONIC APPARATUS, WIRELESS COMMUNICATION METHOD AND COMPUTER-READABLE MEDIUM FOR DEFINING AN ACQUISITION MANNER OF AN UNLICENSED BAND RESOURCE

(71) Applicant: Sony Group Corporation, Tokyo (JP)

(72) Inventors: Xiaodong Xu, Beijing (CN); Mengying Sun, Beijing (CN); Guanyu Chen, Beijing (CN); Wenbo Zhang, Beijing (CN)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/715,951

(22) Filed: Apr. 8, 2022

(65) Prior Publication Data
US 2022/0232392 A1 Jul. 21, 2022

Related U.S. Application Data

(63) Continuation of application No. 16/962,852, filed as application No. PCT/CN2019/085496 on May 5, 2019.

(30) Foreign Application Priority Data

May 10, 2018 (CN) .......................... 201810443767.X

(51) Int. Cl.
*H04W 16/14* (2009.01)
*H04W 76/14* (2018.01)
(Continued)

(52) U.S. Cl.
CPC ......... *H04W 16/14* (2013.01); *H04W 72/042* (2013.01); *H04W 72/048* (2013.01);
(Continued)

(58) Field of Classification Search
CPC ... H04W 16/14; H04W 76/14; H04W 72/042; H04W 72/048; H04W 72/085;
(Continued)

(56) References Cited

U.S. PATENT DOCUMENTS

| 11,228,990 B2* | 1/2022 | Jeon ...................... H04W 52/50 |
| 2014/0328329 A1* | 11/2014 | Novlan ............. H04W 56/0015 370/336 |

(Continued)

FOREIGN PATENT DOCUMENTS

| CN | 106162900 A | 11/2016 |
| CN | 107734560 A | 2/2018 |

(Continued)

OTHER PUBLICATIONS

International Search Report and Written Opinion dated Jul. 29, 2019 for PCT/CN2019/085496 filed on May 5, 2019, 11 pages including English Translation of the International Search Report.

(Continued)

*Primary Examiner* — Mewale A Ambaye
(74) *Attorney, Agent, or Firm* — Xsensus LLP

(57) ABSTRACT

The present disclosure relates to an electronic apparatus, a wireless communication method and a computer-readable medium. According to one embodiment, an electronic apparatus for wireless communication comprises: a processing circuit configured to: determine whether a first user equipment satisfies a condition for performing direct link communication with a second user equipment by using an unlicensed frequency band resource; and if the condition is satisfied, control the first user equipment to perform direct link communication with the second user equipment by using the unlicensed frequency band resource.

20 Claims, 15 Drawing Sheets

(51) Int. Cl.
*H04W 72/04* (2023.01)
*H04W 72/08* (2009.01)
*H04W 72/10* (2009.01)
*H04W 74/08* (2009.01)

(52) U.S. Cl.
CPC ......... *H04W 72/085* (2013.01); *H04W 72/10* (2013.01); *H04W 74/0808* (2013.01); *H04W 76/14* (2018.02)

(58) Field of Classification Search
CPC . H04W 72/10; H04W 74/0808; H04W 72/04; H04W 84/18; H04W 8/22; H04W 72/087; H04W 74/0816
See application file for complete search history.

(56) References Cited

U.S. PATENT DOCUMENTS

| | | | |
|---|---|---|---|
| 2015/0358848 A1* | 12/2015 | Kim | H04W 56/001 370/252 |
| 2017/0188391 A1 | 6/2017 | Rajagopal et al. | |
| 2017/0202043 A1 | 7/2017 | Seo | |
| 2018/0049143 A1* | 2/2018 | Gupta | H04W 16/14 |
| 2018/0054237 A1 | 2/2018 | Tseng et al. | |
| 2019/0191441 A1 | 6/2019 | Kusashima | |
| 2019/0268971 A1* | 8/2019 | Talarico | H04W 88/06 |
| 2019/0306884 A1 | 10/2019 | Palat et al. | |
| 2019/0319768 A1 | 10/2019 | Wu et al. | |
| 2019/0320461 A1 | 10/2019 | Wu et al. | |
| 2020/0014066 A1 | 1/2020 | Shiraga et al. | |
| 2020/0351668 A1* | 11/2020 | Kundu | H04L 5/0092 |
| 2020/0382922 A1 | 12/2020 | Park et al. | |
| 2021/0021363 A1* | 1/2021 | Lee | H04W 48/10 |
| 2021/0029768 A1* | 1/2021 | Shih | H04W 76/30 |

FOREIGN PATENT DOCUMENTS

| | | |
|---|---|---|
| WO | 2017/198175 A1 | 11/2017 |
| WO | 2018/052349 A1 | 3/2018 |
| WO | WO-2021009410 A1 * | 1/2021 ........ H04W 36/0058 |

OTHER PUBLICATIONS

Huawei and Hisilicon, "Sidelink Support & Enhancements for NR," 3GPP TSG RAN WG1 Meeting No. 86, R1-167207, Gothenburg, Sweden, Aug. 22-26, 2016, 7 pages.

LG Electronics, "Further details on channel access in LAA UL," 3GPP TSG RAN WG1 meeting No. 85, R1-164503, Nanjing, China, May 23-27, 2016, 8 pages.

* cited by examiner

ELECTRONIC APPARATUS, WIRELESS COMMUNICATION METHOD AND COMPUTER-READABLE MEDIUM FOR DEFINING AN ACQUISITION MANNER OF AN UNLICENSED BAND RESOURCE

CROSS-REFERENCE TO RELATED APPLICATIONS

This application is a continuation of U.S. application Ser. No. 16/962,852, filed Jul. 17, 2020, which is based on PCT filing PCT/CN2019/085496, filed May 5, 2019, which claims priority to CN 201810443767.X, filed May 10, 2018, the entire contents of each are incorporated herein by reference.

FIELD

The present disclosure generally relates to the field of wireless communications, and in particular to an electronic device for wireless communication, a wireless communication method, and a computer readable medium.

BACKGROUND

Proximity service in LTE (Long Term Evolution) mainly includes device-to-device (D2D) discovery and D2D communication. In addition, UE-to-Network Relay is involved in LTE Rel-13. That is, a user equipment may serve as a relay to provide service to an edge user equipment, thereby improving performance of the edge user equipment.

In the case of UE-to-Network relay, a relay user equipment (relay UE) or a remote user equipment (remote UE) acquires a licensed band resource specified in a specific radio resource control (RRC) message or from system information, so as to perform communication and discovery.

SUMMARY

A brief summary of embodiments of the present disclosure is given in the following, so as to provide basic understanding on some aspects of the present disclosure. It should be understood that, the summary is not an exhaustive summary of the present disclosure. The summary is neither intended to determine key or important parts of the present disclosure, nor intended to limit the scope of the present disclosure. An object of the summary is to provide some concepts in a simplified form, as preamble of a detailed description later.

An electronic device for wireless communication is provided according to an embodiment. The electronic device includes processing circuitry. The processing circuitry is configured to: determine whether a first user equipment satisfies a condition for performing a sidelink communication with a second user equipment using an unlicensed band resource; and control the first user equipment to perform the sidelink communication with the second user equipment using the unlicensed band resource if the condition is satisfied.

A wireless communication method is provided according to another embodiment. The method includes: determining whether a first user equipment satisfies a condition for performing a sidelink communication with a second user equipment using unlicensed band resource; and controlling the first user equipment to perform the sidelink communication with the second user equipment using the unlicensed band resource if the condition is satisfied.

An electronic device for wireless communication is provided according to another embodiment. The electronic device includes processing circuitry. The processing circuitry is configured to: control a first user equipment to perform a sidelink communication with a second user equipment using unlicensed band resource; and perform control to transmit information indicating Maximum Channel Occupancy Time (MCOT) of unlicensed band resource occupied by the first user equipment to the second user equipment, to share the MCOT with the second user equipment.

A wireless communication method is provided according to another embodiment. The method includes: controlling a first user equipment to perform sidelink communication with a second user equipment using unlicensed band resource; and transmitting information indicating MCOT of unlicensed band resource occupied by the first user equipment to the second user equipment, to share the MCOT with the second user equipment.

An electronic device for wireless communication is provided according to another embodiment. The electronic device includes processing circuitry. The processing circuitry is configured to: perform control to transmit indication information to a user equipment. The indication information indicates an acquisition manner of unlicensed band resource used for a sidelink communication of the user equipment. Alternatively, the indication information indicates the unlicensed band resource.

A wireless communication method is provided according to another embodiment. The method includes: transmitting indication information to a user equipment. The indication information indicates an acquisition manner of unlicensed band resource used for a sidelink communication of the user equipment. Alternatively, the indication information indicates the unlicensed band resource.

A computer readable medium is provided according to another embodiment. The computer readable medium includes executable instructions that, when executed by an information processing apparatus, cause the information processing apparatus to execute the method according to the above embodiments.

In the embodiments of the present disclosure, unlicensed resources can be used on a sidelink. Further, service quality for a user can be improved and interference to an apparatus adopting non-3GPP techniques can be reduced by setting a condition for using unlicensed resources by a UE.

BRIEF DESCRIPTION OF THE DRAWINGS

The present disclosure may be understood better with reference to the detailed description given below in conjunction with the drawings. Throughout all the drawings, the same or similar reference numerals indicate the same or similar components. The drawings together with the following detailed description are included in the specification and form a part of the specification, so as to illustrate preferred embodiments of the present disclosure by examples and explain principles and advantages of the present disclosure. In the drawings.

DETAILED DESCRIPTION OF EMBODIMENTS

Figure 1:
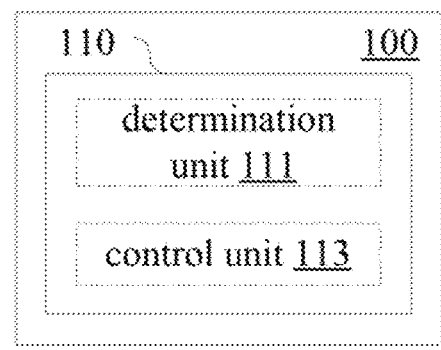
FIG. 1 is a block diagram showing a configuration example of an electronic device for wireless communication according to an embodiment of the present disclosure.

Embodiments of the present disclosure are described below with reference to the drawings. Elements and features described in one of the drawings or one embodiment of the present disclosure may be combined with elements and features described in one or more other drawings or embodiments. It should be noted that representations and descriptions of components and processing which are irrelevant to the present disclosure or known by those skilled in the art are omitted in the drawings and the specification for clarity.

As shown in FIG. 1, an electronic device 100 for wireless communication according to this embodiment includes processing circuitry 110. The processing circuitry 110, for example, may be implemented as a specific chip, a chipset, a central processing unit (CPU) or the like.

The processing circuitry 110 includes a determination unit 111 and a control unit 113. It should be noted that although the determination unit 111 and the control unit 113 are shown in a form of functional blocks in the drawings, it should be understood that functions of units may be implemented by the processing circuitry as a whole, and may be not necessarily implemented by discrete actual components in the processing circuitry. In addition, although the processing circuitry is shown as a box in the drawings, the electronic device may include multiple processing circuitry, and the functions of the units may be distributed into the multiple processing circuitry, so that the multiple processing circuitry cooperates to implement these functions.

The determination unit 111 is configured to determine whether a first user equipment satisfies a condition for performing a sidelink communication with a second user equipment using an unlicensed band resource.

According to an embodiment, the condition is related to one or more of the followings: a service priority of the sidelink communication to be performed; a current link quality between the first user equipment and the second user equipment; the number of failures of Listen Before Talk performed by the first user equipment and/or the second user equipment previously with respect to the unlicensed band resource; a battery level of the first user equipment and/or the second user equipment; and a delay generated in the course of a base station transmitting information, which is to be forwarded by a delay UE of the first user equipment and the second user equipment to a remote UE of the first user equipment and the second user equipment, to the delay UE of the first user equipment and the second user equipment.

In an example, in the above condition, the service priority may include ProSe Per-Packet Priority (PPPP). The link quality may include Reference Signal Receiving Power (RSRP). The number of failures may include the number of subframes for which Listen Before Talk fails within a previous time window having a predetermined length. The delay may include a delay caused by the base station performing Listen Before Talk (LBT) with respect to the unlicensed band resource used for transmitting the information.

Before using an unlicensed sub-resource, a UE is required to perform LBT, resulting in increase in energy consumption of the UE, and delay may be increased due to failure of LBT. In this embodiment, before the unlicensed resource is selected, it is determined whether to select the unlicensed resource based on current link quality, the battery level, data service priority, and a cumulative number of failures of LBT, in order to ensure service quality for the UE.

More specifically, in a case where the relay UE or remote UE selects an unlicensed resource from a resource pool, the condition for using the unlicensed resource by the relay UE or the remote UE may include the followings:

(1) In a case where a data service priority (PPPP) level of sidelink is at a certain level or the required delay is less than a threshold, the relay UE or remote UE directly selects a licensed resource, otherwise the UE is allowed to select the unlicensed resource.

(2) In a case where link quality (RSRP) of a current link is less than a threshold, the relay UE or remote UE directly uses the licensed resource.

(3) In a case where the relay UE or remote UE counts the accumulated number of subframes for which LBT fails within a previous time window and determines that the accumulated number is greater than a threshold, the relay UE or remote UE directly selects the licensed resource.

(4) In a case where a current battery level of the relay UE or remote UE is lower than a threshold, the relay UE or remote UE directly uses the licensed resource.

(5) In a case where the eNB transmits data related to sidelink to the relay UE using the unlicensed resource, and the delay caused by the failure of LBT performed by the eNB is greater than a threshold, the eNB instructs the relay UE to directly use the licensed resource. The relay UE directly selects the licensed resource, so as to avoid excessive delay generated in an entire forwarding process.

The control unit 113 is configured to control the first user equipment to perform the sidelink communication with the second user equipment using the unlicensed band resource in a case where the determination unit 111 determines that the above condition is satisfied.

Figure 11A:
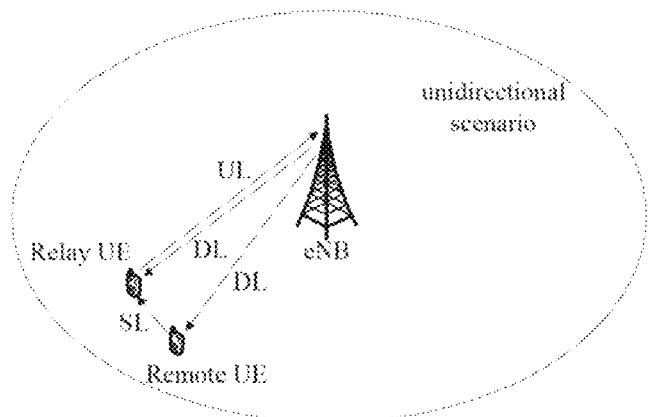
FIGS. 11A to 11C are schematic diagrams for explaining examples of application scenarios of embodiments of the present disclosure.
Figure 11B:
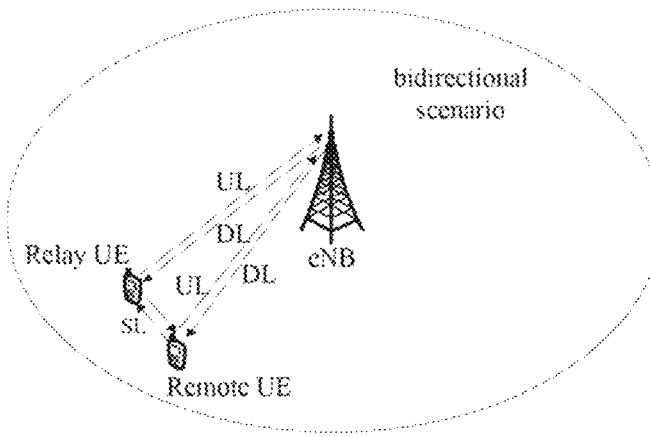
Figure 11C:
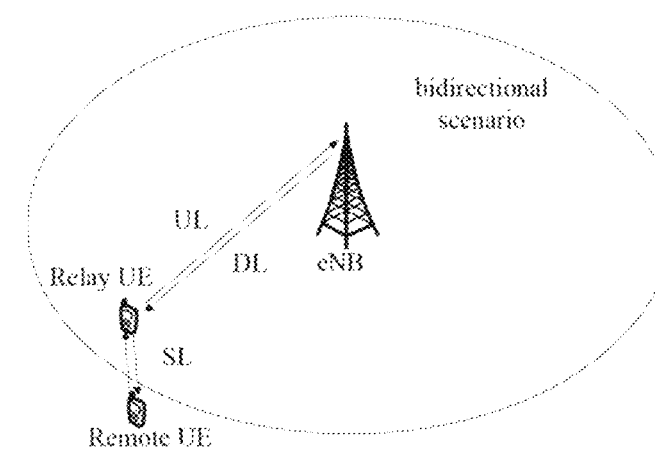

FIGS. 11A to 11C show scenarios for using an unlicensed band in FeD2D (further enhanced D2D) as application examples of embodiments of the present disclosure.

In a unidirectional scenario as shown in FIG. 11A, the relay UE and the remote UE both are in an in-coverage (IC) state, and the remote UE may use the unlicensed resource in sidelink communication and sidelink discovery.

In a bidirectional scenario as shown in FIG. 11B, the relay UE and the remote UE both are in the IC state, the relay UE may use the unlicensed resource in sidelink communication and sidelink discovery, and the remote UE may use the unlicensed resource in sidelink communication and sidelink discovery.

In a bidirectional scenario as shown in FIG. 11C, the relay UE is in the IC state, the remote UE is in an out-of-coverage (OOC) state, the relay UE may use the unlicensed resource in sidelink communication and sidelink discovery, and the remote UE may use the unlicensed resource in sidelink communication and sidelink discovery.

In the embodiment of the present disclosure, the relay UE and the remote UE are configured to perform sidelink communication using an unlicensed band for different scenarios and different states of the UE. Specifically, manners for allocating a resource may include, for example, a manner of eNB direct allocation, a manner of eNB in-direct allocation, a manner of relay UE assisted allocation, and a manner of UE autonomous allocation, and a manner of shared MCOT. Next, exemplary embodiments are described with respect to the above aspects.

It should be noted that the unlicensed band resource used for sidelink communication described in the embodiments of the present disclosure may include an unlicensed band resource used for sidelink communication, or may include an unlicensed band resource used for sidelink discovery.

According to an embodiment, the determination unit 111 is further configured to determine an acquisition manner of the unlicensed band resource according to indication information from the base station. The acquisition manner includes specifying the unlicensed band resource by the base station, or selecting the unlicensed band resource by a user equipment from a configured resource pool or a resource pool list.

More specifically, the indication information may be, for example, included in radio resource control (RRC) signaling. In addition, the configured resource pool or resource pool list may be, for example, indicated by the RRC signaling or a system information block (SIB).

In addition, according to an embodiment, the determination unit 111 is further configured to determine the unlicensed band resource used for the sidelink communication according to indication information from the base station.

More specifically, the indication information may be transmitted through a physical downlink control channel PDCCH. In addition, resource pool information used for the sidelink discovery may be acquired through the RRC signaling and the SIB.

Next, an exemplary embodiment in which a base station allocates an unlicensed band resource is described with reference to specific examples.

Figure 12:
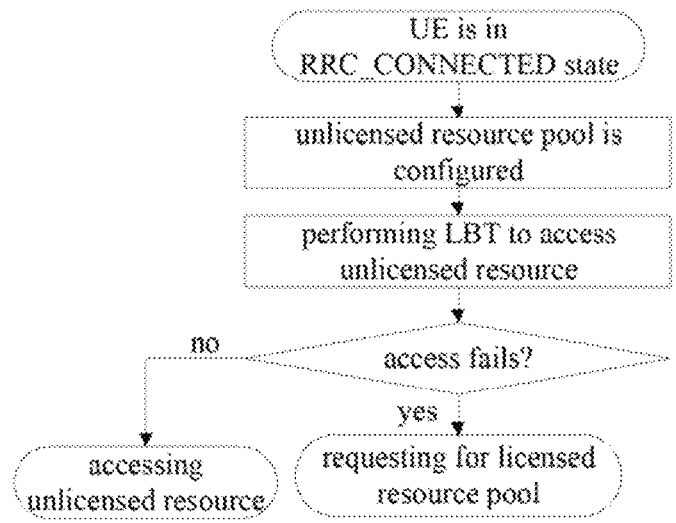
FIG. 12 shows a process for using an unlicensed resource according to an exemplary embodiment.

In a case where the UE is connected to the RRC (RRC_CONNECTED) established by a primary cell, signaling from the base station may be configured as, for example, RRC→sl-commconfig→commTxResources→scheduled. In this case, the relay UE or remote UE may acquire DCI format 5 by blindly detecting the PDCCH, so as to acquire a resource used to transmit the PSCCH and PSSCH on the sidelink. In this case, a process for using the unlicensed resource is shown in FIG. 12.

First, in a case where the relay UE or remote UE is configured with an unlicensed resource in the RRC signaling, the relay UE or remote UE monitors PDCCH DCI 5B to obtain configuration of the unlicensed resource.

Then, according to the configuration of the unlicensed resource, the relay UE or remote UE performs LBT to access the unlicensed resource.

In a case where the cumulative number of times that the relay UE or remote UE fails to access the allocated unlicensed resource is greater than a threshold, the relay UE or remote UE directly requests for a licensed resource to perform the sidelink communication. Otherwise, the relay UE or remote UE occupies the unlicensed band to perform the communication.

In this case, fields such as SLUnlicensed may be added in RRC, as shown in Table

TABLE 1

| Fields added in RCC | |
|---|---|
| Field | Description |
| SLUnlicensed | indicating whether unlicensed resource can be used on Sidelink, 1 bit |
| sl-subframeUnli | subframe scheduled in semi-static scheduling |
| SL-ConfigUnli | sidelink unlicensed resource configuration IE |
| SL-ConfigCommUnli | sidelink communication procedure unlicensed resource configuration IE |
| SL-ConfigDiscUnli | sidelink discovery procedure unlicensed resource configuration IE |

Further, fields included in SL-ConfigUnli IE may be for example as shown in Table 2 below.

TABLE 2

Fields included in SL-ConfigUnli IE

| New field | Description and value |
|---|---|
| Carrier indicator | indicating cross-carrier scheduling, 0 bit or 3 bits |
| PSSCH starting position | indicating a position of a starting symbol for PSSCH, 2 bits |
| PSSCH ending symbol | 0 indicating the last symbol of a subframe; and 1 indicating the penultimate symbol of the subframe, 1 bit |
| Channel Access Type | type of channel access priority, 1 bit |
| Channel Access Priority Class | class of channel access priority, 2 bits, {1, 2, 3, 4} |
| MaxnumberofsubframesSL | maximum number of subframes for which LBT fails, 2 bits |

In addition, the relay UE or remote UE may acquire the configuration of the unlicensed resource, for example, by monitoring PDCCH DCI format 5B. A field of SCI format 0A may be added in the PDCCH DCI format 5B, to indicate the configuration of an unlicensed resource pool for communication data on the sidelink.

In an example, PSSCH SCI 0A\2A and PDCCH DCI 5B\5C may be added.

SCI 0A is newly added to indicate configuration information of the unlicensed resource pool. SCI 0A is based on SCI 0, and the newly added fields are used to indicate configuration of the unlicensed resource used by the PSSCH, including carrier indicator, starting and ending symbols, a type of channel access and a class of channel access priority.

Newly added fields in SCI 0A based on SCI 0 are shown in Table 3 below.

TABLE 3

Fields configuration for SCI 0A

| Field | Description and value |
|---|---|
| Carrier indicator | indicating cross-carrier scheduling, 0 bit or 3 bits |
| PSSCH starting position | indicating a position of a starting symbol for PSSCH, 2 bits |
| PSSCH ending symbol | 0 indicating the last symbol of a subframe; and 1 indicating the penultimate symbol of the subframe, 1 bit |
| Channel Access Type | type of channel access priority, 1 bit |
| Channel Access Priority Class | class of channel access priority, 2 bits, {1, 2, 3, 4} |
| MaxnumberofsubframesSL | maximum number of subframes for which LBT fails, 2 bits |

SCI 2A is newly added to indicate the configuration information of the unlicensed resource pool. This field is used to indicate the configuration information of an unlicensed resource configured by the relay UE for the remote UE to transmit a PSSCH resource. SCI 2A is based on SCI 0, and newly added fields are used to indicate configuration of an unlicensed resource used by PSSCH, including carrier indicator, starting and ending symbols, a type of channel access and a class of channel access priority.

Newly added fields in SCI 2A based on SCI 0 are shown in Table 4 below.

TABLE 4

Fields configuration for SCI 2A

| Field | Description and value |
|---|---|
| Carrier indicator | indicating cross-carrier scheduling, 0 bit or 3 bits |
| PSSCH starting position | indicating a position of a starting symbol for PSSCH, 2 bits |
| PSSCH ending symbol | 0 indicating the last symbol of a subframe; and 1 indicating the penultimate symbol of the subframe, 1 bit |
| Channel Access Type | type of channel access priority, 1 bit |
| Channel Access Priority Class | class of channel access priority, 2 bits, {1, 2, 3, 4} |
| MaxnumberofsubframesSL | maximum number of subframes for which LBT fails, 3 bits |

The newly added PDCCH DCI 5B control signaling is transmitted by the eNB to the relay UE or remote UE, indicates configuration of unlicensed resource used by the relay UE or remote UE to transmit the PSCCH and the PSSCH, and includes SCI 0A.

Based on PDCCH DCI 5, configuration of SCI 0A is added.

The newly added PDCCH DCI 5C control signaling is transmitted by the eNB to the relay UE, includes a resource used by the relay UE to transmit the PSCCH and configuration of an unlicensed resource used by the relay UE to instruct the remote UE to transmit the PSSCH, and includes SCI 2A.

Based on PDCCH DCI 5, configuration of SCI 2A is added.

It should be noted that the signaling configuration described above is only illustrative rather than restrictive.

In addition, the eNB may configure the unlicensed resource pool in a dynamic manner or a semi-static manner.

In the dynamic manner, the eNB dynamically configures the unlicensed resource pool for the relay UE and the remote UE through the PDCCH DCI 5B signaling. The eNB notifies the relay UE or remote UE through the RRC signaling that a scheduling manner of the resource is "scheduled". Then, the eNB transmits the PDCCH DCI 5B (SCI 0A) to the relay UE or remote UE. The relay UE or remote UE performs LBT according to the configuration of the unlicensed resource, to access the unlicensed channel so as to perform the communication.

In the semi-static manner, the eNB semi-statically configures the unlicensed resource pool for the relay UE and remote UE through the PDCCH DCI 5B signaling. The eNB notifies the relay UE or remote UE through the RRC signaling that the scheduling manner of the resource is "scheduled", and configures a parameter for semi-static scheduling of the unlicensed source. Then, the eNB transmits the PDCCH DCI 5B (SCI 0A) to the relay UE or remote UE and activates semi-static scheduling of the unlicensed resource. The relay UE or remote UE performs LBT according to the configuration of the unlicensed resource, to access the unlicensed channel so as to perform the communication.

Figure 13:
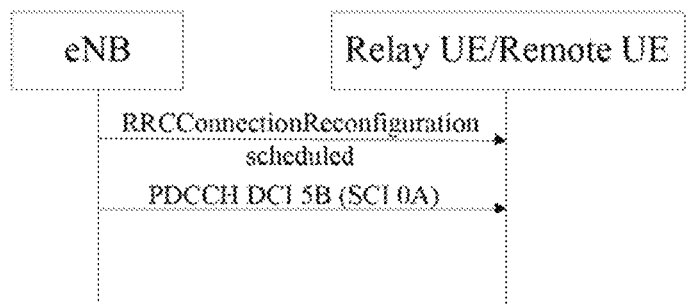
FIG. 13 shows a process for configuring an unlicensed resource according to an exemplary embodiment.

A signaling process of the above example configuration of the unlicensed resource pool is shown in FIG. 13.

In this case, fields such as SLUnlicensed and sl-subframeUnli, may be added in RRC, as shown in Table 1. A form of PDCCH DCI 5B (SCI 0A) control signaling is added, as shown in Table 3.

The exemplary embodiment in which the unlicensed resource is acquired by specifying by the base station is described above. Next, an exemplary embodiment in which the user equipment selects an unlicensed band resource from the configured resource pool or resource pool list is described.

Figure 14:
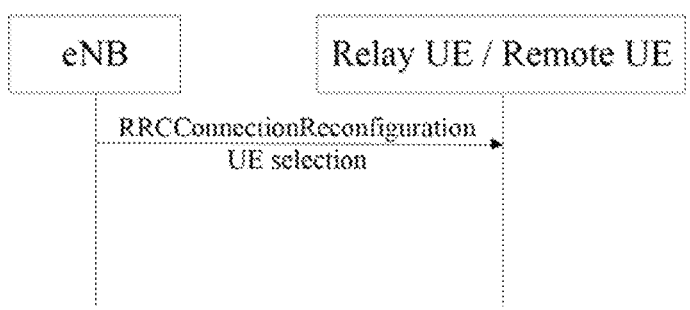
FIG. 14 shows a process for configuring an unlicensed resource according to an exemplary embodiment.

In a case where the UE autonomously selects an unlicensed resource, the signaling from the base station is configured as, for example, RRC→sl-commconfig→commTxReources→ue-selected→commTxPoolNormalDedicated or commTxPoolNormalDedicatedExt. In this case, the relay UE or the remote UE may directly select a resource from a given resource pool to perform the sidelink communication. The signaling process for configuring the unlicensed resource is shown in FIG. 14.

Figure 15:
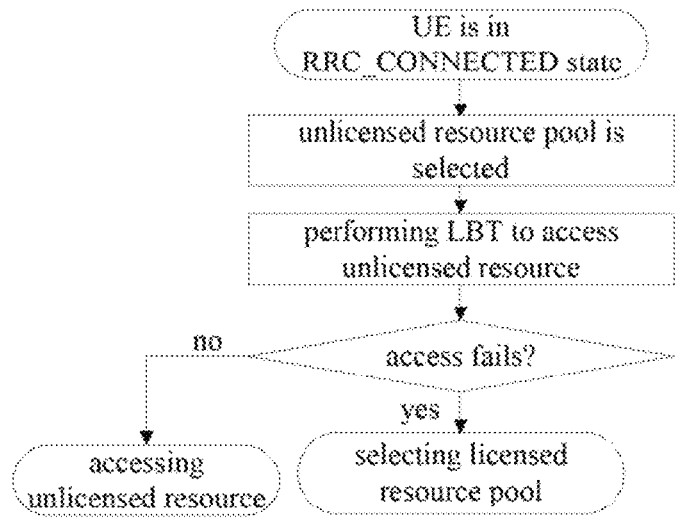
FIG. 15 shows a process for using an unlicensed resource according to an exemplary embodiment.

A process for using the unlicensed resource in this case is shown in FIG. 15.

First, in a case where the relay UE or remote UE is configured to use an unlicensed resource pool in the RRC signaling, and the RRC signaling indicates "ue-selected", the relay UE or remote UE selects a resource pool (which may include licensed resources and unlicensed resources) from an RRC resource pool list.

Then, in a case where the remote UE or the relay UE selects an unlicensed resource pool, the relay UE or the remote UE performs the LBT according to a parameter configured in the RRC signaling.

In a case where the cumulative number of times that the relay UE or remote UE fails to access the allocated unlicensed resource is greater than a threshold, the relay UE or remote UE directly selects a licensed resource from the resource pool list to perform sidelink communication. Otherwise, the relay UE or remote UE occupies the unlicensed band to perform the sidelink communication.

The relay UE and the remote UE may acquire the configuration of the unlicensed resource pool by monitoring the RRC signaling. Further, for example, an unlicensed resource for sidelink and configuration information of channel access may be added to PDCCH DCI 5. In a case where the relay UE selects an unlicensed resource in a resource pool list of RRC signaling, a condition for selecting an unlicensed channel is added before the unlicensed resource is selected, so that delay caused by accessing an unlicensed channel is reduced, thereby improving service quality for the UE.

In this case, fields such as SLUnlicensed and SL-Config-CommUnli, may be added in RRC, as shown in Table 1.

Exemplary embodiments related to the resource used for sidelink communication are described above. Next, exemplary embodiments related to a resource used for sidelink discovery are described below. Similar to the resource for communication, the resource used for sidelink discovery may be acquired in a manner that the base station specifies the unlicensed band resource or in a manner that a user equipment selects the unlicensed band resource from a configured resource pool or a resource pool list.

For a case where the base station specifies the unlicensed band resource used for sidelink discovery (referred to as "discovery" hereinafter), in a case where the UE is in an RRC_CONNECTED state, a resource used by the UE to transmit discovery may be acquired in the RRC signaling. In a case where the RRC signaling indicates "scheduled", the UE uses a specific resource to transmit discovery. In a case where the RRC signaling indicates "ue-selected", the resource used by the UE to transmit discovery is selected from a specific resource pool, for example, discTxPoolDedicated.

Figure 16:
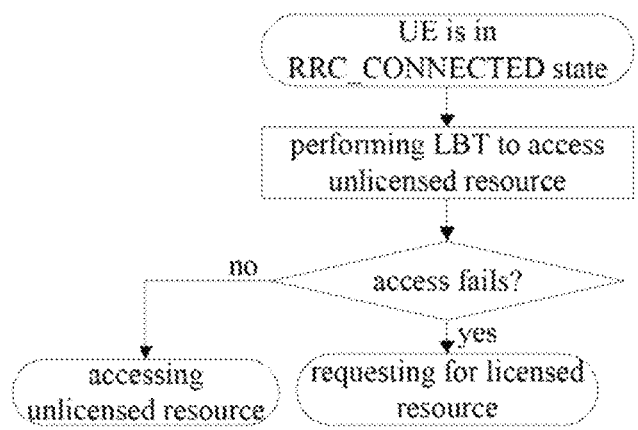
FIG. 16 shows a process for using an unlicensed resource according to an exemplary embodiment.

A process for transmitting discovery in the case of "scheduled" is shown in FIG. 16.

In a case where the relay UE or remote UE is configured with an unlicensed resource in the RRC signaling (scheduled), the relay UE or remote UE performs LBT to access the unlicensed resource. If LBT is performed successfully, the relay UE or remote UE occupies the unlicensed band. If the number of subframes for which the relay UE or remote UE fails to perform LBT reaches a threshold, the relay UE or remote UE may request for a licensed resource pool, for example, through sidelinkUEinformation, to transmit a discovery signal.

System capacity can be increased by using unlicensed resource in the sidelink discovery. Further, the delay of using the unlicensed resource by the UE can be reduced by configuring the cumulative maximum number of subframes for which the LBT fails.

In this case, fields such as SLUnlicensed and SL-ConfigDiscUnli, may be added in RRC, as shown in Table 1.

For the case where the UE selects the unlicensed band resource used for sidelink discovery from the configured resource pool or resource pool list, when the relay UE or remote UE is in the RRC_CONNECTED state and the RRC signaling indicates "ue-selected", the UE is instructed to select a resource from the resource pool. In a case where the configured resource pool includes an unlicensed resource and the unlicensed resource is selected, the UE performs LBT according to a parameter of channel access. In a case where the relay UE or remote UE fails to access the unlicensed channel in the configured maximum number of subframes, the relay UE or remote UE directly selects a licensed resource pool with high priority. In a case where the LBT is successfully performed, discovery is transmitted on the unlicensed channel.

Figure 17:
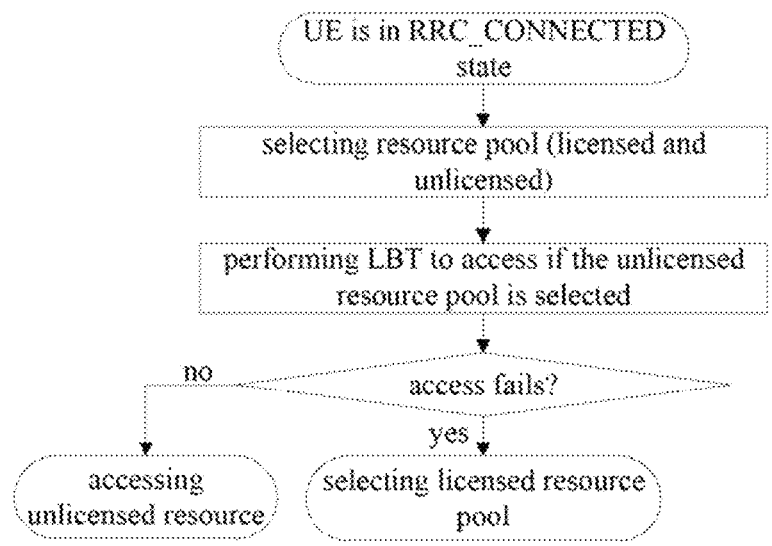
FIG. 17 shows a process for using an unlicensed resource according to an exemplary embodiment.

A process for transmitting discovery in the case of "ue-selected" is shown in FIG. 17.

In a case where the relay UE or remote UE is configured with an unlicensed resource in the RRC signaling (ue-selected), the relay UE or remote UE selects a resource in the RRC signaling. In a case where the unlicensed resource is selected, the relay UE or remote UE performs LBT to access the unlicensed resource. If the LBT is successfully performed, the relay UE or remote UE occupies the unlicensed channel. If the maximum number of subframes for which LBT performed by the relay UE or remote UE fails is greater than the threshold, the relay UE or remote UE selects a licensed resource pool based on the RRC signaling.

The UE selects the unlicensed resource pool from the resource pool list configured in the RRC to perform the discovery. Delay and power consumption due to use of the unlicensed resource can be effectively reduced by adding the condition for selecting the unlicensed resource.

In this case, new fields such as SLUnlicensed and SL-ConfigDiscUnli may be added in RRC, as shown in Table 1.

Next, an exemplary embodiment in which the base station indirectly allocates an unlicensed resource for the remote UEs is described.

According to an embodiment, the relay UE forwards one or more of the following to the remote UE: information indicating the unlicensed band resource used for the sidelink communication; and information indicating a resource pool of the unlicensed band resource used for sidelink communication.

In a case where the RRC signaling indicates that an SL communication resource is "scheduled", and the UE is in the RRC_CONNECTED state in the primary cell, the RRC signaling is configured as RRC→sl-commconfig→commTxResources→scheduled. The eNB notifies a relay UE connected to a remote UE of configuration of an unlicensed resource for the remote UE through the RRC signaling. The relay UE completely forwards configuration information of an unlicensed resource pool to the remote UE.

Figure 18:
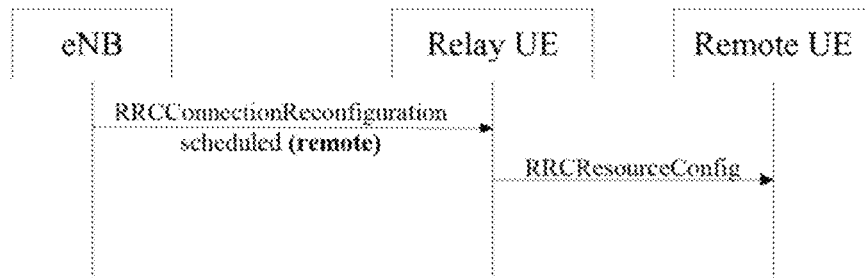
FIG. 18 shows a process for configuring an unlicensed resource according to an exemplary embodiment.

A specific signaling process is shown in FIG. 18.

The eNB notifies the relay UE of configuration information of an unlicensed resource pool for the remote UE through the RRC signaling. The relay UE completely forwards the configuration information of the unlicensed resource pool for the remote UE to the remote UE, for example, through RRCResourceConfig signaling. The remote UE performs LBT according to the configuration information of the unlicensed resource.

In this case, fields such as SLUnlicensed and SL-Config-CommUnli, may be added in RRC, as shown in Table 1. In addition, a field of RRCResourceConfig may be introduced (as shown in Table 5).

TABLE 5

| RRCResourceConfig signaling | |
|---|---|
| Signaling | Description |
| RRCResourceConfig | Relay UE forwards resource configuration information for remote UE |

In addition, in a case where the RRC signaling indicates that the SL communication resource is "ue-selected", and the UE is in the RRC_CONNECTED state in the primary cell, the RRC signaling may be configured as, for example, RRC→sl-commconfig→commTxResources→ue-selected→commTxPoolNormalDedicated or commTxPool-NormalDedicatedExt. The eNB notifies the relay UE connected to the remote UE of configuration of the unlicensed resource for the remote UE through the RRC signaling. The relay UE completely forwards configuration information of an unlicensed resource pool to the remote UE. The resource pool list (including licensed resources and unlicensed resources) may be configured in the RRC signaling of the relay UE.

Figure 19:
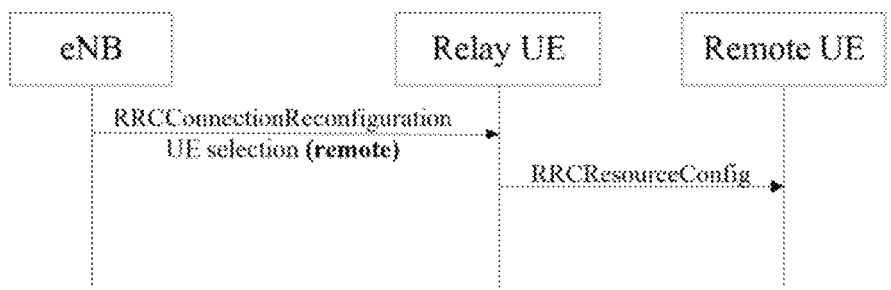
FIG. 19 shows a process for configuring an unlicensed resource according to an exemplary embodiment.

A specific process is shown in FIG. 19. The eNB transmits the configuration information of the unlicensed resource pool for the remote UE to the relay UE through the RRC signaling. The relay UE completely forwards the configuration information of the unlicensed resource pool for the remote UE to the remote UE through the RRCResourceConfig signaling. If the remote UE selects an unlicensed resource pool according to the configuration of the resource pool, the remote UE performs LBT to access the unlicensed resource.

In this exemplary embodiment, the remote UE acquires a resource forwarded via the relay UE, so that the configuration of the unlicensed resource may be configured in the RRC signaling of the relay UE. After acquiring configuration information of the resource for the remote UE, the relay UE completely forwards the configuration information to the remote UE. The remote UE may acquire the configuration of the unlicensed resource to access the unlicensed channel according to the configuration information forwarded by the relay UE.

In this case, fields such as SLUnlicensed and SL-Config-CommUnli, may be added in RRC, as shown in Table 1. In addition, a field of RRCResourceConfig may be introduced (as shown in Table 5).

Figure 20:
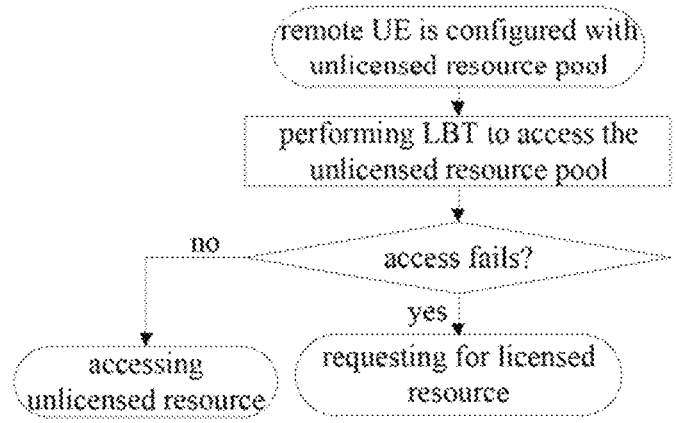
FIG. 20 shows a process for using an unlicensed resource according to an exemplary embodiment.
Figure 21:
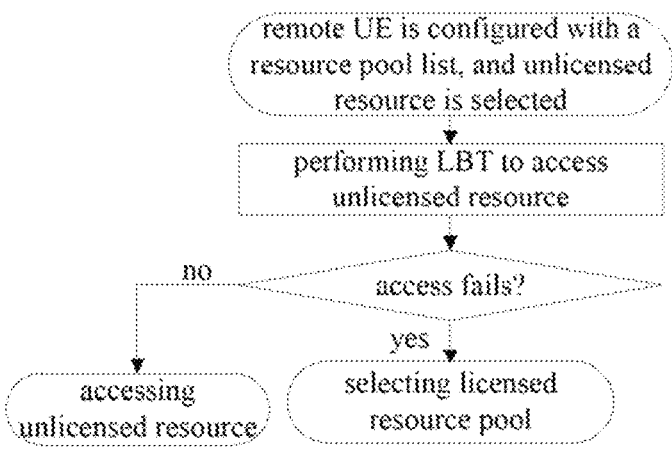
FIG. 21 shows a process for using an unlicensed resource according to an exemplary embodiment.

FIGS. 20 and 21 show processes that the remote UE uses an unlicensed resource according to an exemplary embodiment.

As shown in FIG. 20, in the case where the remote UE is configured with the unlicensed resource, the remote UE performs LBT according to a usage parameter of the configured unlicensed resource. If the cumulative number of times that the remote UE fails to access the allocated unlicensed resource is greater than the threshold, the remote UE directly requests for the licensed resource to perform the sidelink communication. Otherwise, the remote UE occupies the unlicensed band to perform the communication.

As shown in FIG. 21, in the case where the remote UE is configured with an unlicensed resource list, and the remote UE selects an unlicensed resource from the unlicensed resource pool list, the remote UE performs LBT according to a usage parameter of the configured unlicensed resource. If the cumulative number of times that the remote UE fails to access the allocated unlicensed resource is greater than the threshold, the remote UE directly selects the licensed resource to perform the sidelink communication. Otherwise, the remote UE occupies the unlicensed band to perform communication.

Next, embodiments of relay UE assisted resource allocation are described.

According to an embodiment, the relay UE receives information indicating the unlicensed band resource used for the sidelink communication from the base station, and notifies the remote UE of the indicated unlicensed band resource.

Alternatively, the relay UE may receive information indicating a resource pool of the unlicensed band resource used for the sidelink communication from the base station, select the unlicensed band resource used for the sidelink communication for the remote UE, and notify the remote UE of the selected unlicensed band resource.

For example, the relay UE may perform this notification through a physical Sidelink control channel (PSCCH).

Figure 22:
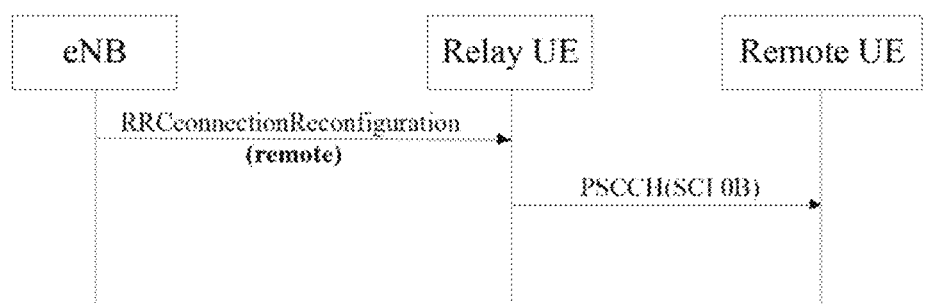
FIG. 22 shows a process for configuring an unlicensed resource according to an exemplary embodiment.

More specifically, the eNB may notify a relay UE connected to the remote UE of the unlicensed resource configuration (ue-selected or scheduled) for the remote UE through the RRC signaling. In a case where the RRC signaling indicates "ue-selected", the relay UE may select a resource from the resource pool for the remote UE, and notify the remote UE of the configuration of the unlicensed resource in the sidelink communication through PSCCH SCI 2A. In a case where the RRC signaling indicates "scheduled" and the scheduled resource is an unlicensed resource, the relay UE may notify the remote UE of the configuration of the unlicensed resource in the sidelink communication through, for example, PSCCH SCI 2A. The remote UE performs LBT according to the configuration information to access the unlicensed band. A configuration process is shown in FIG. 22.

In this exemplary embodiment, the relay UE assists the remote UE in acquiring configuration information of the unlicensed resource in the RRC signaling, and allocates the configuration information of the unlicensed resource to the remote UE through the PSCCH. The remote UE directly performs LBT. If the PSSCH is transmitted after a channel is occupied, the PSCCH is unnecessary to be transmitted. Therefore, signaling overhead and energy consumption of the remote UE can be reduced.

In this case, fields such as SLUnlicensed and SL-Config-CommUnli (as shown in Table 1) and SCI 2A sidelink control information (as shown in Table 4) may be added in RRC.

In addition, according to an embodiment, the relay UE may notify the remote UE of the unlicensed band resource that is allocated to the relay UE.

Figure 23:
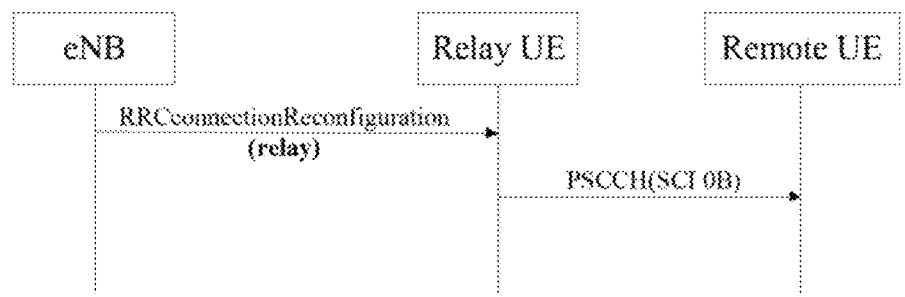
FIG. 23 shows a process for configuring an unlicensed resource according to an exemplary embodiment.

More specifically, in the case where the relay UE is configured with the unlicensed resource through the RRC signaling (ue-selected) or the activated semi-static unlicensed resource, the relay UE may configure the unlicensed resource for the remote UE according to the configuration of the unlicensed resource pool of the relay UE. The relay UE may notify the remote UE of the configuration of the unlicensed resource in the sidelink communication through, for example, PSCCH SCI 0. The remote UE performs LBT according to the configuration information to access the unlicensed band. A configuration process is shown in FIG. 23.

The relay UE shares the configured unlicensed resource with the remote UE, and allocates the configured unlicensed resource to the remote UE through the PSCCH. The remote UE directly performs LBT. If the PSSCH is transmitted after a channel is occupied, the PSCCH is unnecessary to be transmitted. Therefore, the signaling overhead and energy consumption of the remote UE can be reduced. Further, signaling overhead for requesting for a sidelink resource from the base station can be reduced.

In this case, fields such as SLUnlicensed and SL-ConfigCommUnli (as shown in Table 1) may be added to RRC. Further, SCI 2A sidelink control information (as shown in Table 4) may be added.

In addition, according to an embodiment, the relay UE may perform LBT with respect to an unlicensed band resource to be allocated to the remote UE, and notify the remote UE of a successfully accessed unlicensed channel.

Figure 24:
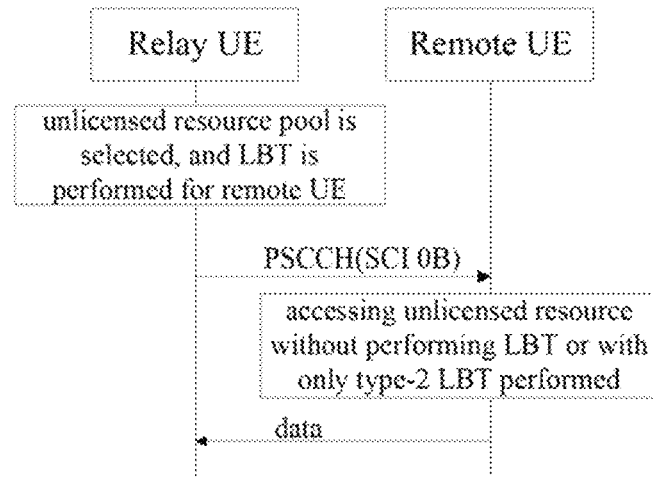
FIG. 24 shows a process for configuring an unlicensed resource according to an exemplary embodiment.

More specifically, in the case where the relay UE selects the unlicensed resource for the remote UE, in order to reduce the energy consumption of the remote UE performing LBT, the relay UE may perform LBT for the remote UE and then access the unlicensed channel, and notify the remote UE of the unlicensed channel through, for example, PSCCH SCI 2A. In this case, the remote UE may perform type-2 LBT or not perform LBT when accessing the unlicensed channel. A configuration process is shown in FIG. 24.

A type of LBT is described briefly here. In the current cellular network, unlicensed bands used in uplink data transmission and downlink data transmission channels are dynamically scheduled. The UE or eNB performs LBT before accessing the unlicensed channel. The standard stipulates that at least a clear channel assessment (CCA) detection, that is, energy detection, is performed. In a case where energy of the unlicensed band is detected to exceed a threshold, it is indicated that the unlicensed channel is occupied. Currently, there are four types of LBT: CAT1 LBT in which LBT is not performed; CAT2 LBT in which LBT is performed while random rollback is not performed; CAT3 LBT in which LBT is performed and a rollback competition window has a fixed size; and CAT4 LBT in which LBT is performed and a rollback competition window has a variable size. The 3GPP standard specifies two types of uplink unlicensed channel access; type-1 in which CAT4 LBT is adopted and LBT parameters are configured according to the channel access priority class; and type-2 in which LBT is performed for 25 us.

In a case where the relay UE configures unlicensed information for the remote LIE, the relay LIE assists the remote UE in performing LBT to occupy the unlicensed channel, thereby reducing the signaling overhead and the energy consumption of the remote UE.

In this case, fields such as SLUnlicensed and SL-ConfigCommUnli (as shown in Table 1) may be added to RRC. Further, SCI 2A sidelink control information (as shown in Table 4) may be added.

For a process that the remote UE accesses the unlicensed channel, one may refer to the process that the remote UE uses the unlicensed resource according to the above exemplary embodiment.

Figure 2:
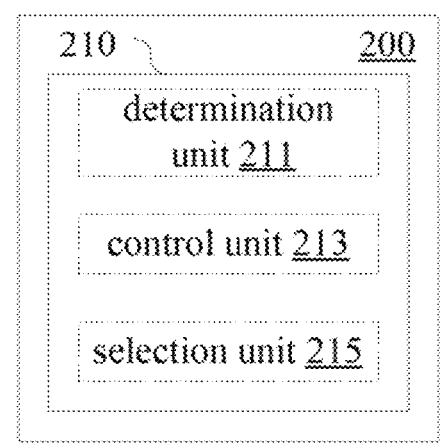
FIG. 2 is a block diagram showing a configuration example of an electronic device for wireless communication according to another embodiment of the present disclosure.

FIG. 2 shows a configuration example of an electronic device for wireless communication according to an embodiment.

As shown in FIG. 2, an electronic device 200 includes processing circuitry 210. The processing circuitry 210 includes a determination unit 211, a control unit 213 and a selection unit 215. The determination unit 211 and the control unit 213 are similar to the determination unit 111 and the control unit 113, respectively.

The selection unit 215 is configured to select an unlicensed band resource used for the sidelink communication based on zone configuration information.

Next, selection of the unlicensed resource based on a zone is described by examples.

Figure 25:
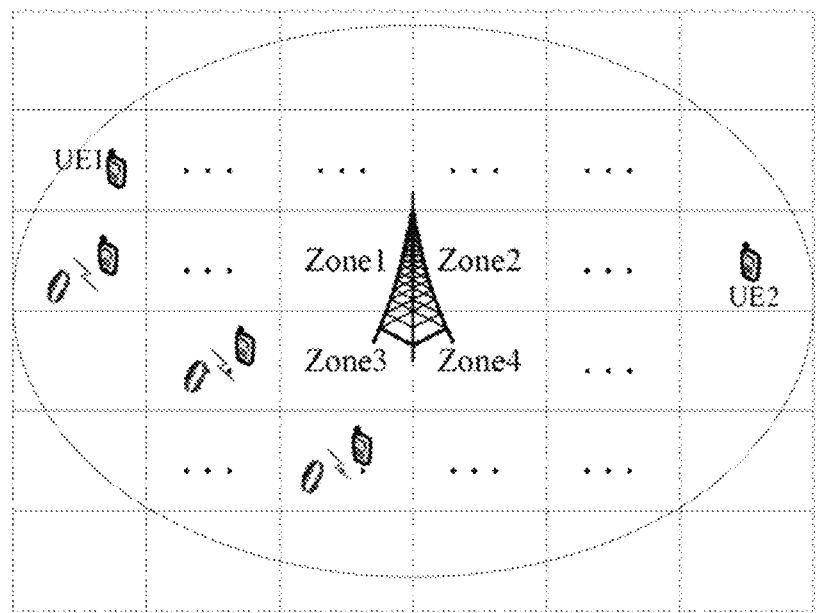
FIG. 25 is a schematic diagram for explaining selection of an unlicensed resource based on a zone.

In a case where the remote UE is in an RRC_IDLE state, a resource used for the remote UE to perform sidelink communication, for example, may be selected from a resource pool of commTxPoolNormalCommon in SIB18. In a case where a field of priority list (priority list) is configured, a resource pool is selected based on a priority in this field. In a case where this field is not configured, for example, a first resource pool may be selected. Since the remote UE selects the resource in SIB 18, multiple remote UEs may select the same unlicensed resource on same subframes, thereby resulting in a channel access conflict. Therefore, the zone is introduced when the unlicensed resource is used. The eNB acquires the unlicensed resource from the SIB 18 based on the zone, to reduce conflict among the remote UEs accessing the unlicensed channel. FIG. 25 shows an example of zone division.

For example, the unlicensed resource may be configured in a resource pool list of SIB18, and UnlicensedEnabledZoneList and ZoneConfig are configured in SIB18.

When a UE selects a resource pool in SIB 18 and selects an unlicensed resource pool, the UE checks whether its zone ID is in the UnlicensedEnabledZoneList list. If the zone ID is in the list, the UE is allowed to use the selected unlicensed resource.

Figure 26:
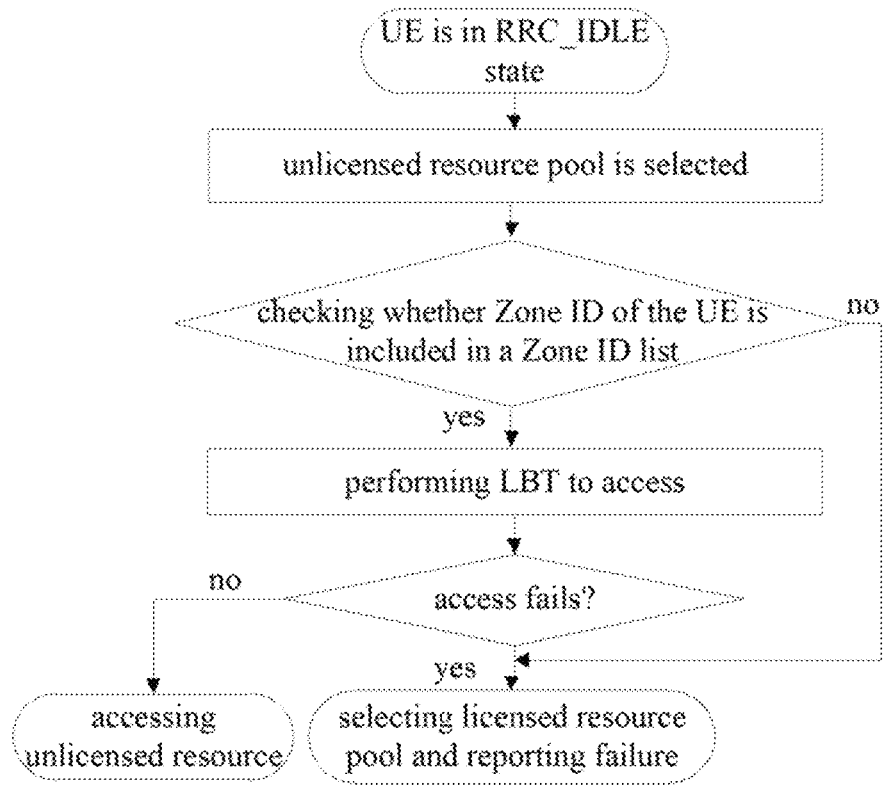
FIG. 26 shows a process for using an unlicensed resource according to an exemplary embodiment.

In this configuration, a process that the sidelink communication is performed using the unlicensed resource is shown in FIG. 26.

The Unlicensed resource is configured in a resource pool list of SIB18. If the remote UE selects the unlicensed resource pool and the zone ID of the remote UE is included in the UnlicensedEnabledZoneList, the UE performs LBT to access the unlicensed resource based on the configuration information. In a case where the LBT is performed successfully, the UE occupies the unlicensed resource. In a case where the number of subframes for which LBT fails is greater than the maximum number of subframes, the UE, for example, may directly select a licensed resource pool.

Through the above embodiments, usage of unlicensed resources in each zone can be flexibly enabled, thereby effectively reducing unlicensed channel access conflict and reducing delay.

In this case, fields such as SLUnlicensed and SL-ConfigCommUnli (as shown in Table 1) and SCI 2A sidelink control information (as shown in Table 4) may be added to the RRC. In addition, configuration information related to the zone may be introduced, as shown in Table 6.

TABLE 6

Fields added in SIB18

| Field | Description |
| --- | --- |
| ZoneConfigComm | indicating zone configuration for D2D communication |
| SLCommZoneListUnli | indicating a list of zone IDs for which unlicensed resources can be used to perform D2D communication |
| SL-ConfigCommUnli | Sidelink communication procedure unlicensed resource configuration IE |

Further, an unlicensed resource pool used for sidelink discovery may also be selected based on the zone.

Specifically, in a case where the UE is in the RRC_IDLE state, the relay UE and the remote UE, for example, may acquire resources for transmitting discovery from SIB19. In a case where an unlicensed resource pool used for the sidelink discovery is configured in SIB19, an unlicensed channel access conflict may be caused. In order to reduce an access collision of the unlicensed resource pool, zone configuration may be introduced, as shown in FIG. 25. The eNB divides the zone to control the sidelink to use the unlicensed resource to transmit the discovery.

In a case where the unlicensed resource is configured in SIB19, a field of UnlicensedEnabledZoneList may be configured to indicate a zone list for unlicensed resources in SIB19, and a field of ZoneConfig may be configured for zone. In a case where the relay UE or remote-UE selects an unlicensed resource in SIB19, the relay UE or remote-UE checks whether its zone ID is in the UnlicensedEnabledZoneList list. If the zone ID is in this list, the relay UE or remote UE is allowed to use the selected unlicensed resource. A process for using an unlicensed resource in SIB 19 is similar to that shown in FIG. 26.

In this case, fields such as SLUnlicensed and SL-ConfigDiscUnli (as shown in Table 1) may be added to the RRC and configuration information related to the zone may be introduced, as shown in Table 7.

TABLE 7

Fields added in SIB19

| Field | Description |
| --- | --- |
| ZoneConfigDisc | indicating zone configuration for D2D discovery |
| SLDiscZoneListUnli | indicating a list of zone IDs for which unlicensed resources can be used to perform D2D discovery |
| SL-ConfigDiscUnli | Sidelink discovery procedure unlicensed resource configuration IE |

Next, embodiments for sharing MCOT are described.

According to an embodiment, the control unit 113 or 213 may be further configured to perform control to transmit information indicating maximum channel occupancy time MCOT of unlicensed band resource occupied by the first user equipment to the second user equipment, to share the MCOT with the second user equipment.

The sharing the MCOT described here includes that: the first user equipment shares a remaining subframe of the unlicensed resource occupied by the first user equipment to the second user equipment. The first user does not use the unlicensed resources during the sharing period.

In addition, the maximum channel occupancy time MCOT of unlicensed band resource occupied by the first user equipment may also be used for the sidelink discovery.

For the relay UE and the remote UE, according to an embodiment, the relay UE receives information on the maximum channel occupancy time (MCOT) of unlicensed band resource for a cellular link from the base station, and uses the unlicensed band resource to perform sidelink communication with the remote UE within the MCOT.

Next, manners for sharing the MCOT are described in connection with specific examples.

Figure 27:
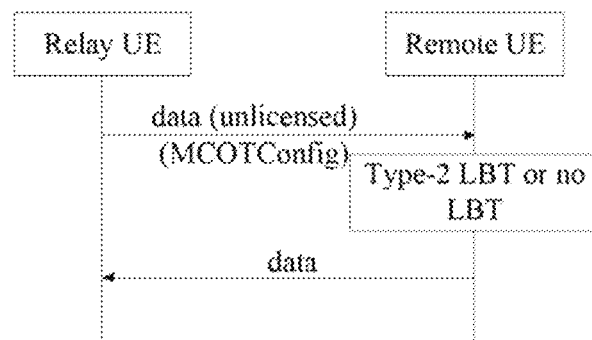
FIG. 27 shows an example process for sharing MCOT according to an exemplary embodiment.

In a first example, in a case where a Uu link uses an unlicensed resource, the relay UE uses the unlicensed resource to perform sidelink communication. The relay UE shares the unlicensed resource occupied by the relay UE to the remote UE and adds a field of MCOTConfig. The remote UE performs type-2 LBT or does not perform LBT to access an unlicensed channel. The field of MCOTConfig includes the number of remaining unlicensed subframes and an unlicensed channel access parameter. The remote UE uses the unlicensed resource within the MCOT. The remote UE may not transmit the PSCCH, and directly transmits the PSSCH to save available unlicensed subframes. Signaling configuration is shown in FIG. 27.

The relay UE activates the remote UE to use the unlicensed resource through PSCCH SCI 2A. If the relay UE is to terminate the use of the unlicensed resource by the remote UE, the relay UE deactivates the use of the unlicensed resource through PSCCH SCI 2A.

In this case, the relay UE configures the unlicensed channel access parameter in MCOTconfig.

The MCOTconfig IE may include the number of available subframes and the unlicensed channel access parameter. For example, fields included in the MCOTconfig IE are shown in Table 8.

TABLE 8

MCOTconfig IE

| Field | Description and value |
| --- | --- |
| NumberSubframe | number of remaining available subframes, 3 bits |
| PSSCH starting position | indicating a position of a starting symbol for transmission, 2bits |
| PSSCH ending symbol | 0 indicating that the last symbol of a subframe is a termination transmission symbol; and 1 indicating that the penultimate symbol of the subframe is the termination transmission symbol, 1 bit |
| Channel Access Type | indicating a type of unlicensed channel access, 1 bit |
| Channel Access Priority Class | indicating a class of channel access priority, 2 bits, {1, 2, 3, 4} |

Figure 28:
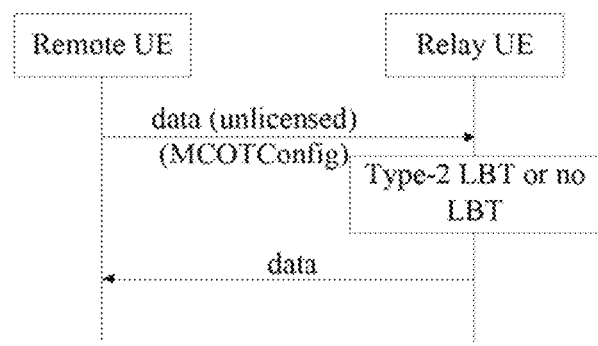
FIG. 28 shows an example process for sharing MCOT according to an exemplary embodiment.

In a second example, in a case where the Uu link uses an unlicensed resource, the remote UE uses the unlicensed resource to perform the sidelink communication. The remote UE shares the unlicensed resource occupied by the remote UE to the relay UE and adds a field of MCOTConfig. The relay UE performs type-2 LBT or does not perform LBT to access the unlicensed channel. The field of MCOTConfig includes the number of remaining unlicensed subframes and an unlicensed channel access parameter. The Relay UE uses the unlicensed resource within the MCOT. The relay UE may not transmit the PSCCH, and directly transmits the PSSCH to save available unlicensed subframes. Signaling configuration is shown in FIG. 28.

Through this configuration, the relay UE and the remote UE share unlicensed information of the MCOT. The relay UE or remote UE may perform simple LBT (for example, type-2 LBT) or may not perform LBT to access the unlicensed channel, thereby reducing signaling overhead, energy consumption and delay.

In this case, the remote UE configures the unlicensed channel access parameter in MCOTconfig, such as Number-Subframe, PSSCH starting position, PSSCH ending symbol, Channel Access Type, and Channel Access Priority Class, as shown in Table 8.

In the above first and second examples, the MCOT is shared between the relay UE and the remote UE, and the Uu link may use the licensed resource or the unlicensed resource.

Figure 29:
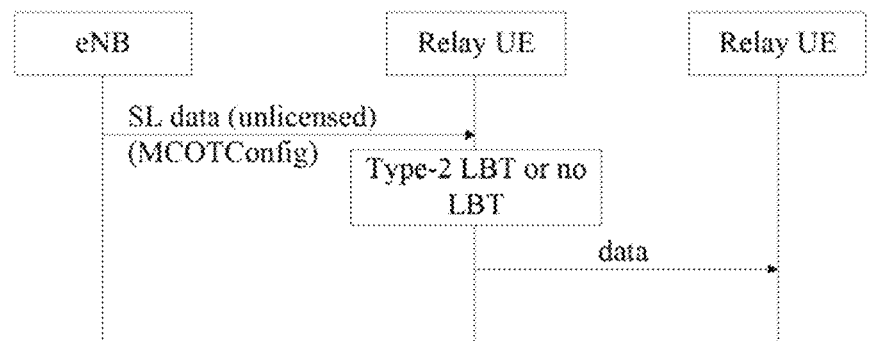
FIG. 29 shows an example process for sharing MCOT according to an exemplary embodiment.

In a third example, in a case where the Uu link uses an unlicensed resource pool to transmit data related to sidelink to the relay UE, the relay UE may share the unlicensed resource for Uu link to perform sidelink communication. A process is shown in FIG. 29. The eNB transmits sidelink data to the relay LE, and shares the remaining unlicensed subframes with the relay UE to perform sidelink communication. The eNB notifies the relay UE of parameter configuration of accessing the unlicensed band through the field of MCOTConfig. The remote UE performs type-2 LBT or does not perform LBT according to the configuration information to occupy the unlicensed channel.

The eNB activates the relay UE to use the unlicensed resource through PDCCH DCI 5B, and configures the unlicensed resource access parameter. If the eNB is to terminate the use of the unlicensed resource by the relay UE, the eNB deactivates the use of the unlicensed resource through the PDCCH DCI 5B.

In this case, the eNB configures the unlicensed channel access parameter in MCOTconfig, as shown in Table 8.

In a fourth example, in a case where the relay UE or remote UE uses a model B ("who is there" mode) discovery to perform a discovery process, a UE at the receiving side may access the unlicensed channel within the MCOT.

Figure 30:
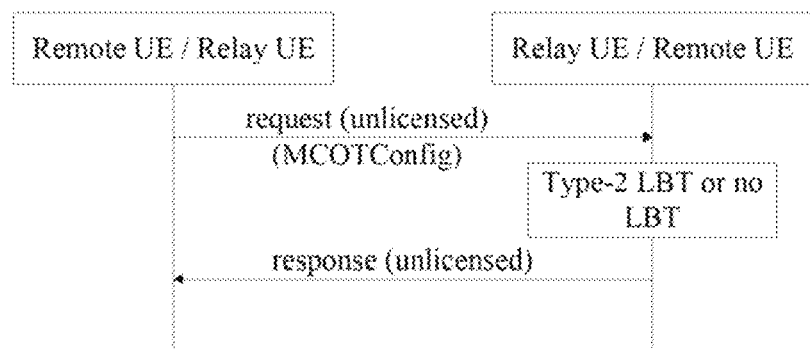
FIG. 30 shows an example process for sharing MCOT according to an exemplary embodiment.

In a case where a UE at the transmitting side transmits a discovery solicitation message to use the unlicensed resource, within the MCOT, the UE at the receiving side may perform type-2 LBT to access the unlicensed channel to transmit a discovery response message. Alternatively, the UE at the receiving side may not perform LBT to access the unlicensed channel to transmit the discovery response message. The discovery solicitation message includes configuration information of the MCOT, and at least a channel access parameter, and the number of remaining available unlicensed subframes. In this manner, delay and energy consumption generated when the UE at the receiving side accesses the unlicensed resource can be effectively reduced. A signaling process in this case is shown in FIG. 30.

In this case, the eNB configures the unlicensed channel access parameter in MCOTconfig, as shown in Table 8.

In the present disclosure, the configuration process of the unlicensed parameter on the sidelink is provided, so that a D2D user can acquire the unlicensed resource. Processes of using unlicensed resources in D2D communication and D2D discovery are provided in the present disclosure, and include the configuration and use of the unlicensed resource. When selecting a resource, the UE considers data service priority, link quality or current batter level of an apparatus of a user, so that delay and service quality degradation caused by the use of the unlicensed resource by the UE can be reduced while increasing system capacity. Further, energy consumption of a low-power apparatus is reduced.

In the above description of the electronic device according to the embodiments of the present disclosure, it is apparent that some methods and processes are also disclosed. Next, a description of the methods according to embodiments of the disclosure is given without repeating the details described above.

Figure 3:
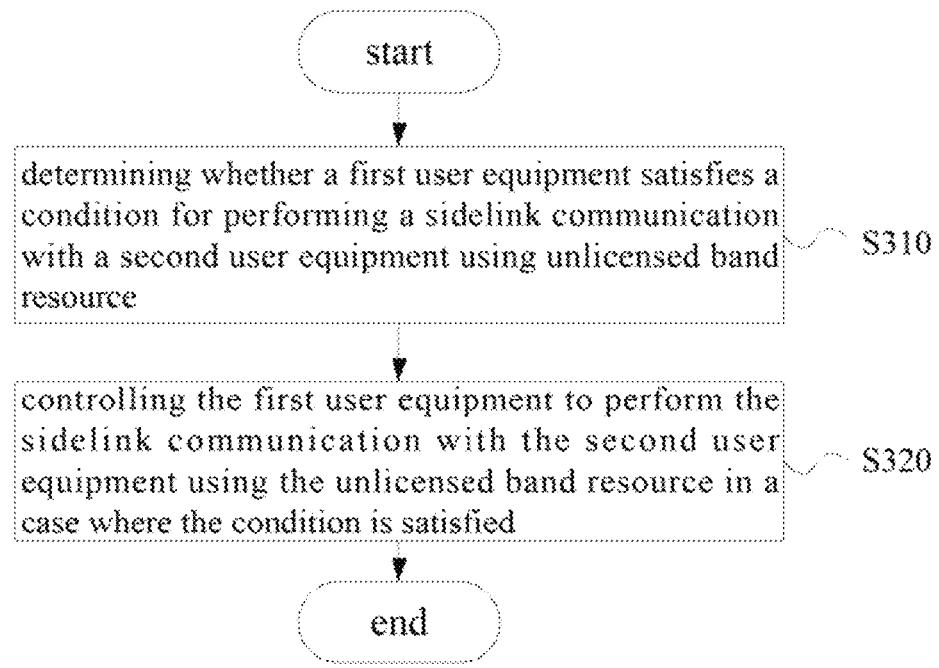
FIG. 3 is a flowchart showing a process example of a wireless communication method according to an embodiment of the present disclosure.

As shown in FIG. 3, a wireless communication method according to an embodiment includes the following steps S310 to 320.

In S310, it is determined whether a first user equipment satisfies a condition for performing a sidelink communication with a second user equipment using unlicensed band resource.

In S320, if the condition is satisfied, the first user equipment is controlled to perform the sidelink communication with the second user equipment using the unlicensed band resource.

Figure 4:
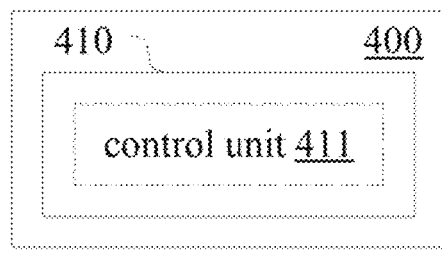
FIG. 4 is a block diagram showing a configuration example of an electronic device for wireless communication according to an embodiment of the present disclosure.

FIG. 4 shows a configuration example of an electronic device for wireless communication according to another embodiment. An electronic device 400 includes processing circuitry 410. The processing circuitry 410 includes a control unit 411, which is configured to control the first user equipment to perform the sidelink communication with the second user equipment using the unlicensed band resource and perform control to transmit information indicating MCOT of unlicensed band resource occupied by the first user equipment to the second user equipment, to share the MCOT with the second user equipment.

According to an embodiment, one of the first user equipment and the second user equipment operates as a relay UE, and the other of the first user equipment and the second user equipment operates as a remote UE. The remote UE receives information from the base station via the relay UE. The relay UE receives from the base station information indicating the MCOT of unlicensed band resource for a cellular link, and performs sidelink communication with the remote UE using the unlicensed band resource within the MCOT.

According to an embodiment, the maximum channel occupancy time (MCOT) of the unlicensed band resource occupied by the first user equipment is used for sidelink discovery.

Figure 5:
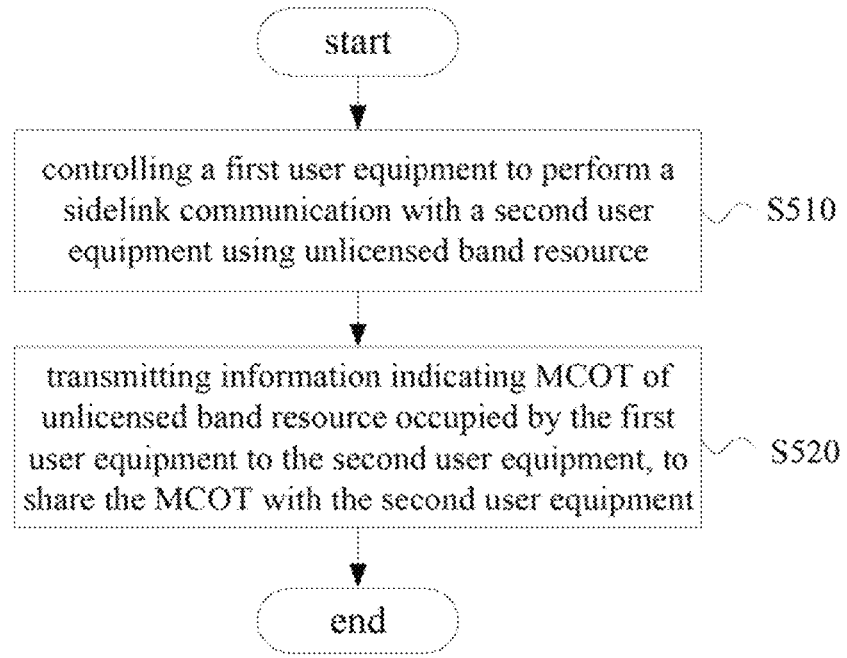
FIG. 5 is a flowchart showing a process example of a wireless communication method according to an embodiment of the present disclosure.

As shown in FIG. 5, a wireless communication method according to an embodiment includes the following steps S510 to S520.

In S510, the first user equipment is controlled to perform sidelink communication with a second user equipment using unlicensed band resource.

In S520, information indicating MCOT of unlicensed band resource occupied by the first user equipment is transmitted to the second user equipment, to share the MCOT with the second user equipment. More specifically, the second user equipment may perform LBT according to configuration of the MCOT, to use the unlicensed resource.

Figure 6:
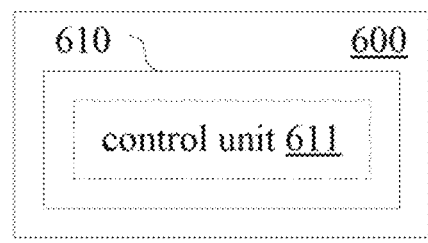
FIG. 6 is a block diagram showing a configuration example of an electronic device for wireless communication according to an embodiment of the present disclosure.

FIG. 6 shows a configuration example of an electronic device for wireless communication according to another embodiment. The electronic device 600 includes processing circuitry 610. The processing circuitry 610 includes a control unit 611, which is configured to perform control to transmit indication information to a user equipment. The indication information indicates an acquisition manner of unlicensed band resource used for a sidelink communication of the user equipment. Alternatively, the indication information indicates the unlicensed band resource.

The acquisition manner may include: specifying the unlicensed band resource by the base station; or selecting the unlicensed band resource by a user equipment from a configured resource pool or a resource pool list.

Figure 7:
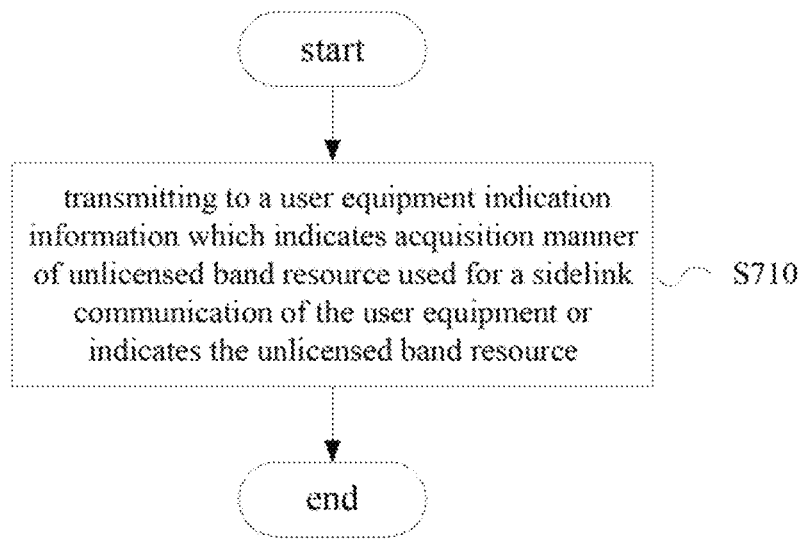
FIG. 7 is a flowchart showing a process example of a wireless communication method according to an embodiment of the present disclosure.

As shown in FIG. 7, a wireless communication method according to an embodiment includes the following step S710.

In S710, indication information is transmitted to a user equipment. The indication information indicates an acquisition manner of unlicensed band resource used for a sidelink communication of the user equipment. Alternatively, the indication information indicates the unlicensed band resource.

In addition, a computer readable medium is further provided according to an embodiment of the present disclosure. The computer readable medium includes executable instructions that, when executed by an information processing apparatus, cause the information processing apparatus to execute the methods according to the embodiments of the present disclosure.

For example, steps of the above methods and modules and/or units of the above devices may be implemented as software, firmware, hardware, or a combination thereof. In a case where steps of the above methods and modules and/or units of the above devices are implemented by software or firmware, a computer (for example, a general-purpose computer 800 shown in FIG. 8) having a dedicated hardware structure may be installed with a program constituting software for implementing the above methods from a storage medium or a network. When being installed with various programs, the computer is capable of performing various functions.

Figure 8:
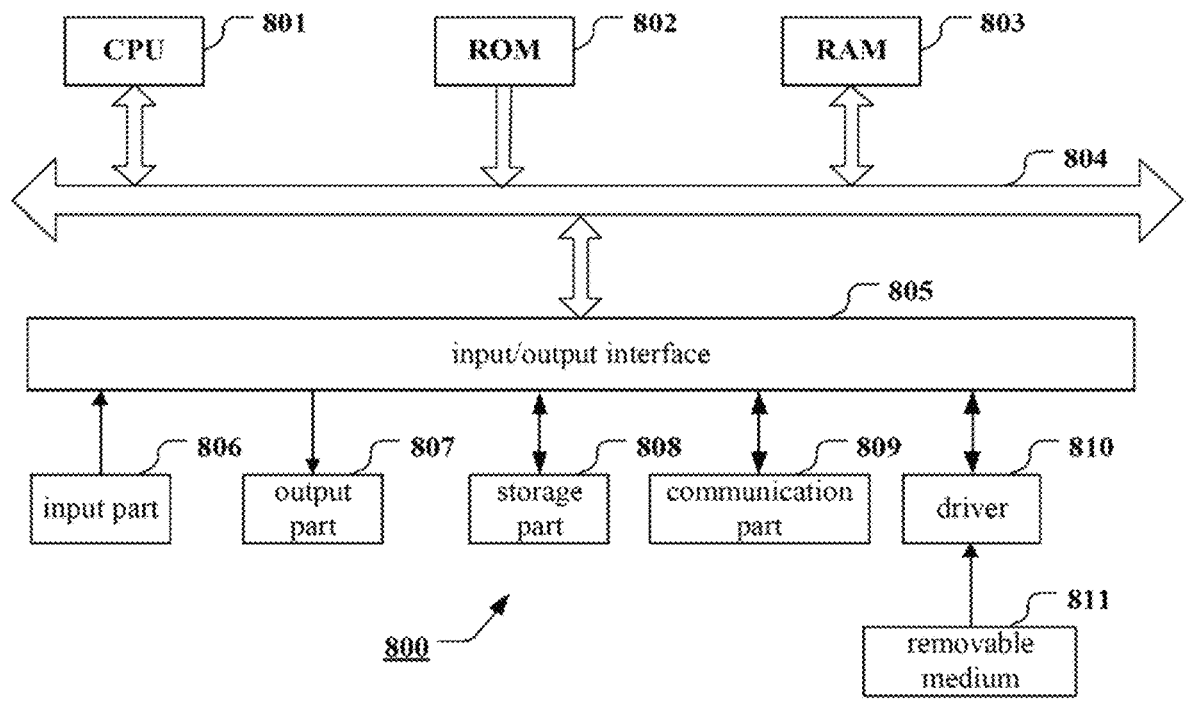
FIG. 8 is a block diagram showing an exemplary structure of a computer that implements methods and devices according to the present disclosure.

In FIG. 8, an arithmetic processing unit (that is, CPU) 801 performs various processing according to a program stored in a read-only memory (ROM) 802 or a program loaded from a storage part 808 to a random-access memory (RAM) 803. Data required when the CPU 801 performs various processing is also stored in the RAM 803 as needed. The CPU 801, the ROM 802, and the RAM 803 are linked to each other via a bus 804. An input/output interface 805 is also linked to the bus 804.

The following components are linked to the input/output interface 805: an input part 806 (including a keyboard, a mouse or the like), an output part 807 (including a display such as a cathode ray tube (CRT), a liquid crystal display (LCD), a speaker or the like), a storage part 808 (including a hard disk or the like), and a communication part 809 (including a network interface card such as a LAN card, a modem or the like). The communication part 809 performs communication processing via a network such as the Internet. A driver 810 may also be linked to the input/output interface 805 as needed. A removable medium 811 such as a magnetic disk, an optical disk, a magneto-optical disk, a semiconductor memory may be installed on the driver 810 as needed, so that a computer program read from the removable medium 811 is installed into the storage part 808 as needed.

In a case where the above series of processing are implemented by software, a program constituting the software is installed from a network such as the Internet, or a storage medium such as the removable medium 811.

Those skilled in the art should understand that the storage medium is not limited to the removable medium 811 shown in FIG. 8 that stores a program and is distributed separately from the apparatus so as to provide the program to the user. The removable medium 811, for example, may include: a magnetic disk (including a floppy disk (registered trademark)); an optical disk (including a compact disk read only memory (CD-ROM) and a digital versatile disc (DVD)); a magneto-optical disk (including a minidisc (MD) (registered trademark)); and a semiconductor memory. Alternatively, the storage medium may be the ROM 802, a hard disk included in the storage part 808 or the like. The storage medium has a program stored therein and is distributed to the user together with an apparatus in which the storage medium is included.

A program product storing machine-readable instruction codes is further provided according to an embodiment of the present disclosure. The instruction codes, when being read and executed by a machine, may perform the methods according to the above embodiments of the present disclosure.

Accordingly, a storage medium for carrying the program product storing the machine-readable instruction codes is also provided according to the present disclosure. The storage medium may include but is not limited to a floppy disk, an optical disk, a magneto-optical disk, a memory card, a memory stick or the like.

The following electronic apparatus is involved in the embodiments of the present disclosure. In a case where the electronic apparatus is used for base station side, the electronic apparatus may be implemented as any type of gNB or evolved node B (eNB), such as a macro eNB and a small eNB. The small eNB may be an eNB of a cell having a smaller coverage than a macro cell, such as a pico-cell eNB, a micro eNB and a home (femto) eNB. Alternatively, the electronic apparatus may be implemented as any other types of base stations, such as a NodeB and a base transceiver station (BTS). The electronic apparatus may include: a main body (also referred to as a base station apparatus) configured to control the wireless communication; and one or more remote radio heads (RRH) provided at a different position from the main body. In addition, various types of terminals, which are described below, may each serve as a base station by performing functions of the base station temporarily or semi-persistently.

In a case where the electronic apparatus is used for user equipment side, the electronic apparatus may be implemented as a mobile terminal (such as a smartphone, a tablet personal computer (PC), a notebook PC, a portable game terminal, a portable/dongle mobile router and a digital camera) or a vehicle terminal (such as an automobile navigation apparatus). Furthermore, the electronic apparatus may be a wireless communication module (such as an integrated circuitry module including a single die or multiple dies) mounted on each of the terminals described above.

[Application Example for a Terminal Apparatus]

Figure 9:
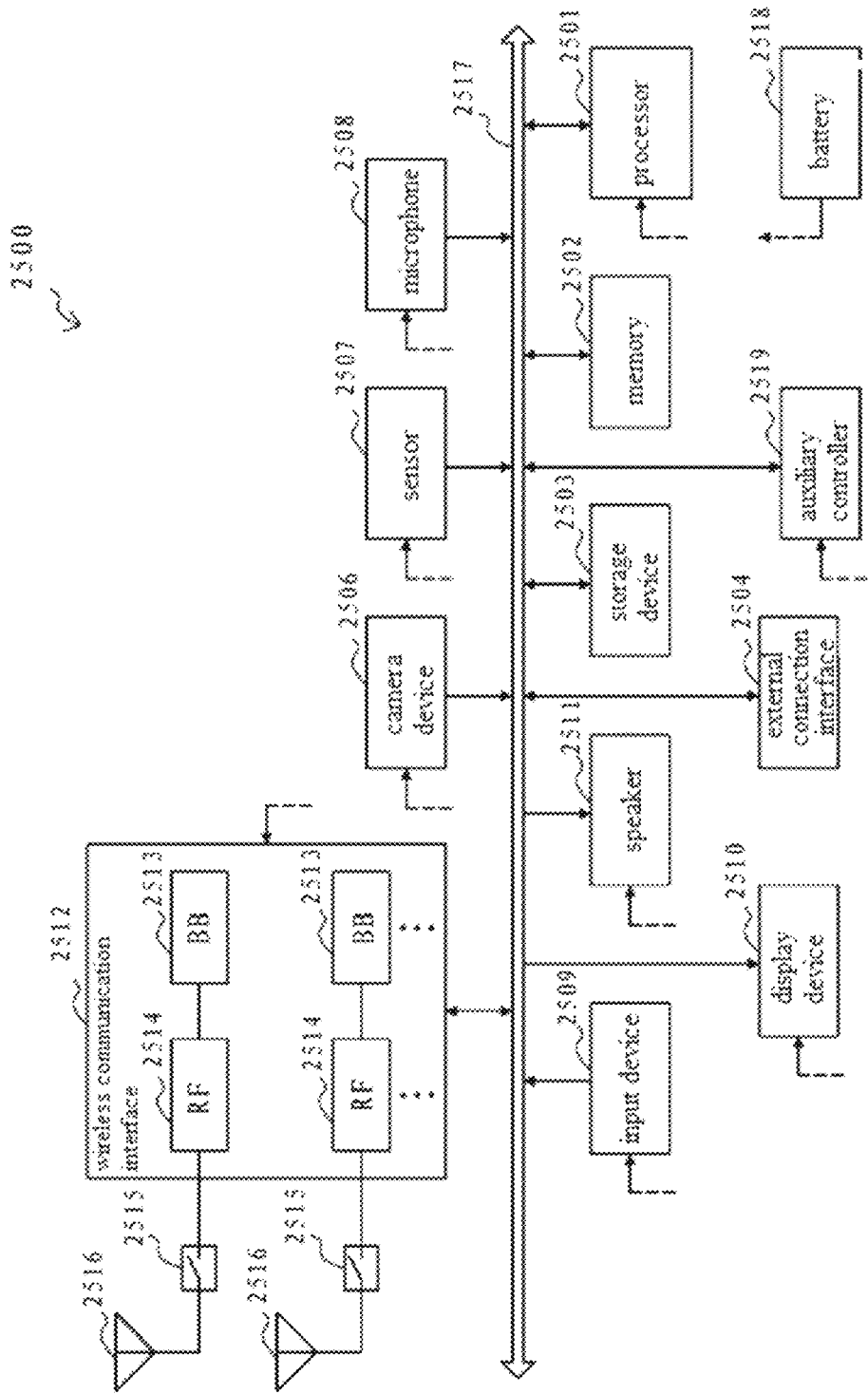
FIG. 9 is a block diagram showing an exemplary configuration of a smartphone to which technology according to the present disclosure may be applied.

FIG. 9 is a block diagram showing an exemplary configuration of a smartphone 2500 to which technology according to the present disclosure may be applied. The smartphone 2500 includes a processor 2501, a memory 2502, a storage device 2503, an external connection interface 2504, a camera device 2506, a sensor 2507, a microphone 2508, an input device 2509, a display device 2510, a speaker 2511, a wireless communication interface 2512, one or more antenna switches 2515, one or more antennas 2516, a bus 2517, a battery 2518 and an auxiliary controller 2519.

The processor 2501 may be, for example, a CPU or a system on chip (SoC), and controls functions of an application layer and another layer of the smartphone 2500. The memory 2502 includes an RAM and an ROM, and stores data and a program executed by the processor 2501. The storage device 2503 may include a storage medium such as a semiconductor memory and a hard disk. The external connection interface 2504 is an interface for connecting an external device (such as a memory card and a universal serial bus (USB) device) to the smartphone 2500.

The camera device 2506 includes an image sensor (such as a charge coupled device (CCD) and a complementary metal oxide semiconductor (CMOS)), and generates a captured image. The sensor 2507 may include a group of sensors such as a measurement sensor, a gyro sensor, a geomagnetic sensor, and an acceleration sensor. The microphone 2508 converts sound that is inputted to the smartphone 2500 into an audio signal. The input device 2509 includes, for example, a touch sensor configured to detect touch on a screen of the display device 2510, a keypad, a keyboard, a button, or a switch, and receives an operation or information inputted from a user. The display device 2510 includes a screen (such as a liquid crystal display (LCD) and an organic light-emitting diode (OLED) display), and displays an output image of the smartphone 2500. The speaker 2511 is configured to convert an audio signal outputted from the smartphone 2500 into sound.

The wireless communication interface 2512 supports any cellular communication scheme (such as LTE and LTE-Advanced), and performs wireless communication. The wireless communication interface 2512 may include, for example, a baseband (BB) processor 2513 and radio frequency (RF) circuitry 2514. The BB processor 2513 may perform, for example, coding/decoding, modulating/demodulating and multiplexing/de-multiplexing, and perform various types of signal processing for wireless communications. The RF circuitry 2514 may include, for example, a mixer, a filter and an amplifier, and transmits and receives a wireless signal via an antenna 2516. The wireless communication interface 2512 may be a chip module having the BB processor 2513 and the RF circuitry 2514 integrated thereon. As shown in FIG. 9, the wireless communication interface 2512 may include multiple BB processors 2513 and multiple RF circuitry 2514. Although FIG. 9 shows an example in which the wireless communication interface 2512 includes the multiple BB processors 2513 and the multiple RF circuitry 2514, the wireless communication interface 2512 may include a single BB processor 2513 or single RF circuitry 2514.

Besides the cellular communication scheme, the wireless communication interface 2512 may support an additional type of wireless communication scheme, such as a short-distance wireless communication scheme, a near field communication scheme and a wireless local area network (LAN) scheme. In this case, the wireless communication interface 2512 may include the BB processor 2513 and the RF circuitry 2514 for each wireless communication scheme.

Each of the antenna switches 2515 switches connection destinations of the antennas 2516 among multiple circuitry (such as circuitry for different wireless communication schemes) included in the wireless communication interface 2512.

Each of the antennas 2516 includes a single or multiple antenna elements (such as multiple antenna elements included in an MIMO antenna), and is used for the wireless communication interface 2512 to transmit and receive a wireless signal. The smartphone 2500 may include multiple antennas 2516, as shown in FIG. 9. Although FIG. 9 shows an example in which the smartphone 2500 includes the multiple antennas 2516, the smartphone 2500 may also include a single antenna 2516.

In addition, the smartphone 2500 may include an antenna 2516 for each type of wireless communication scheme. In this case, the antenna switches 2515 may be omitted from the configuration of the smartphone 2500.

The processor 2501, the memory 2502, the storage device 2503, the external connection interface 2504, the camera device 2506, the sensor 2507, the microphone 2508, the input device 2509, the display device 2510, the speaker 2511, the wireless communication interface 2512, and the auxiliary controller 2519 are connected to each other via the bus 2517. The battery 2518 supplies power to blocks of the smartphone 2500 shown in FIG. 9 via feeders which are partially shown with dashed lines in the drawings. The auxiliary controller 2519, for example, operates a minimum necessary function of the smartphone 2500 in a sleep mode.

In the smartphone 2500 shown in FIG. 9, the transceiving device of the apparatus for user equipment side according to an embodiment of the present disclosure may be implemented by the wireless communication interface 2512. At least a part of functions of the processing circuitry and/or units of the electronic device or the information processing apparatus for user equipment side according to the embodiments of the present disclosure may be implemented by the processor 2501 or the auxiliary controller 2519. For example, the auxiliary controller 2519 may perform a part of functions of the processor 2501, to reduce power consumption of the battery 2518. Further, the processor 2501 or the auxiliary controller 2519 may perform at least a part of functions of the processing circuitry and/or the units of the electronic device or the information processing apparatus for user equipment side according to the embodiments of the present disclosure by executing a program stored in the memory 2502 or the storage device 2503.

[Application Example for a Base Station]

Figure 10:
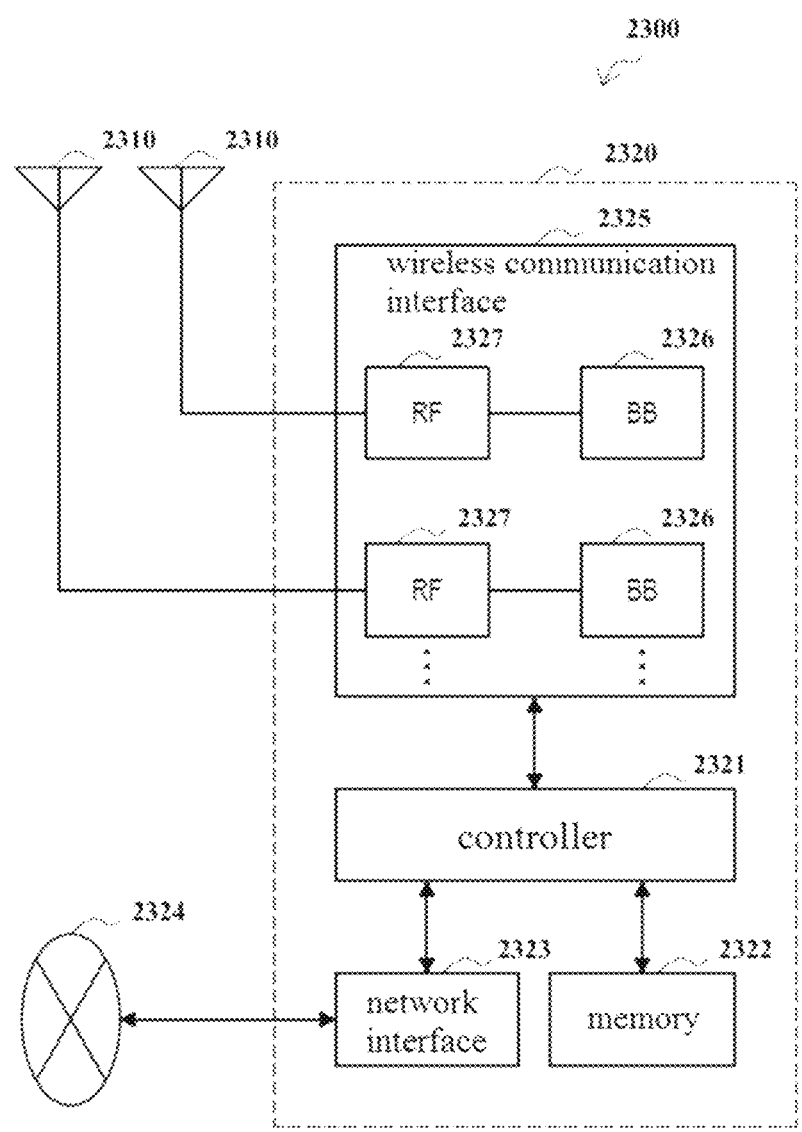
FIG. 10 is a block diagram showing an exemplary configuration of a base station to which the technology according to the present disclosure may be applied.

FIG. 10 is a block diagram showing an exemplary configuration of a base station such as an evolved (eNB) to which the technology according to the present disclosure may be applied. An eNB 2300 includes one or more antennas 2310 and a base station apparatus 2320. Each of the antennas 2310 is connected to the base station apparatus 2320 via a radio frequency (RF) cable.

Each of the antennas 2310 includes a single antenna element or multiple antenna elements (such as multiple antenna elements included in a multiple-input multiple-output (MIMO) antenna), and is used for the base station apparatus 2320 to transmit and receive a wireless signal. The eNB 2300 may include multiple antennas 2310, as shown in FIG. 10. For example, the multiple antennas 2310 may be compatible with multiple frequency bands used by the eNB 2300. Although FIG. 10 shows an example in which the eNB 2300 includes multiple antennas 2310, the eNB 2300 may include a single antenna 2310.

The base station apparatus 2320 includes a controller 2321, a memory 2322, a network interface 2323, and a wireless communication interface 2325.

The controller 2321 may be, for example, a CPU or a DSP, and operate various functions of a high layer of the base station apparatus 2320. For example, the controller 2321 generates a data packet based on data in a signal processed by the wireless communication interface 2325 and transmits the generated packet via the network interface 2323. The controller 2321 may bundle data from multiple baseband processors to generate a bundled packet and transmit the generated bundled packet. The controller 2321 may have a logic function that performs control such as radio resource control, wireless bearer control, mobility management, admission control, and scheduling. The control may be performed in combination with a nearby eNB or core network node. The memory 2322 includes an RAM and an ROM, and stores a program executed by the controller 2321 and various types of control data (such as a terminal list, transmission power data and scheduling data).

The network interface 2323 is a communication interface via which the base station apparatus 2320 is connected to a core network 2324. The controller 2321 may communicate with a core network node or another eNB via the network interface 2323. In this case, the eNB 2300 may be connected to the core network node or other eNB via a logical interface (such as an S1 interface and an X2 interface). The network interface 2323 may also be a wired communication interface or a wireless communication interface for wireless backhaul line. If the network interface 2323 is the wireless communication interface, the network interface 2323 may use a frequency band for wireless communication higher than a frequency band used by the wireless communication interface 2325.

The wireless communication interface 2325 supports any cellular communication scheme (such as long term evolution (LTE) and LTE-Advanced), and provides wireless connection to a terminal positioned in a cell of the eNB 2300 via an antenna 2310. The wireless communication interface 2325 may include, for example, a BB processor 2326 and RF circuitry 2327. The BB processor 2326 may perform, for example, encoding/decoding, modulating/demodulating and multiplexing/de-multiplexing, and various types of signal processing of layers (such as L1, medium access control (MAC), radio link control (RLC) and packet data convergence protocol (PDCP)). Instead of the controller 2321, the BB processor 2326 may have a part or all of the above logic functions. The BB processor 2326 may be implemented as a memory storing a communication control program, or a module including a processor configured to execute a program and related circuitry. The function of the BB processor 2326 may be changed by updating the program. The module may be a card or blade inserted into a slot of the base station apparatus 2320. Alternatively, the module may be a chip installed on the card or the blade. Further, the RF circuitry 2327 may include, for example, a mixer, a filter or an amplifier, and transmits and receives a wireless signal via the antenna 2310.

As shown in FIG. 10, the wireless communication interface 2325 may include multiple BB processors 2326. For example, the multiple BB processors 2326 may be compatible with multiple frequency bands used by the eNB 2300. As shown in FIG. 10, the wireless communication interface 2325 may include multiple RF circuitry 2327. For example, the multiple RF circuitry 2327 may be compatible with multiple antenna elements. Although FIG. 10 shows an example in which the wireless communication interface 2325 includes multiple BB processors 2326 and multiple RF circuitry 2327, the wireless communication interface 2325 may include a single BB processor 2326 or single RF circuitry 2327.

In the eNB 2300 shown in FIG. 10, the transceiving device of the apparatus for base station side according to an embodiment of the present disclosure may be implemented by the wireless communication interface 2325. At least a part of functions of the processing circuitry and/or units of the electronic device or the information processing apparatus for base station side according to the embodiment of the present disclosure may be implemented by the controller 2321. For example, the controller 2321 may perform at least a part of functions of the processing circuitry and/or the units of the electronic device or the information processing apparatus for base station side according to the embodiment of the present disclosure by executing the program stored in the memory 2322.

In the above description of specific embodiments of the present disclosure, features described and/or illustrated for one embodiment may be used in one or more other embodiments in the same or similar manner, or may be combined with features in other embodiments, or may replace features in other embodiments.

It should be emphasized that terms of "include/comprise" used herein indicate presence of a feature, an element, a step, or a component, but do not exclude presence or addition of one or more other features, elements, steps or components.

In the above embodiments and examples, reference signs consisting of numbers are used to represent steps and/or units. Those skilled in the art should understand that these reference numerals are only for purpose of illustration and drawing and are not indicative of the order or any other limitations thereof.

In addition, the method according to the present disclosure is not limited to be performed in the chronological order described herein, and may be performed in other chronological order, in parallel or independently. Therefore, the order in which the method is performed described herein does not limit the technical scope of the present disclosure.

Although the present disclosure is described above through the specific embodiments of the present disclosure, it should be understood that all embodiments and examples described above are illustrative rather than restrictive. Various modifications, improvements and equivalents may be made to the present disclosure by those skilled in the art within the scope and spirit of the attached claims. These modifications, improvements or equivalents should fall within the protection scope of the present disclosure.

The invention claimed is:

1. An electronic device configured to operate as a base station in a wireless communication network, comprising:
   a transceiver configured to communicate with a first user equipment; and
   a processing circuitry configured to:
   control the first user equipment to perform a sidelink communication with a second user equipment if a condition for performing the sidelink communication by the first user equipment with the second user equipment is satisfied,
   wherein the processing circuitry is configured to control the first user equipment to perform the sidelink communication with the second user equipment by:
   transmitting, to the first user equipment, first configuration information that identifies an acquisition manner of transmission resource,
   wherein the first configuration information is included in a radio resource control (RRC) signaling and comprises one of a first value or a second value,
   wherein the first value identifies that the acquisition manner is a base station scheduled manner where the transmission resource is scheduled by the base station to the first user equipment,
   wherein the second value identifies that the acquisition manner is a user equipment selected manner where the first user equipment selects the transmission resource from a configured resource pool or a resource pool list; and
   configuring, to the first user equipment, information identifying the configured resource pool or the resource pool list via the RRC signaling or a system information block (SIB).

2. The electronic device according to claim 1, wherein in a case that the acquisition manner being the base station scheduled manner, the circuitry is configured to schedule, the transmission resources on unlicensed band for the first user equipment to perform sidelink communication, based on a priority or a delay requirement of sidelink data to be transmitted.

3. The electronic device according to claim 1, wherein the configured resource pool or the resource pool list comprises transmission resources on both of unlicensed band and licensed band, in a case that the acquisition manner being the user equipment selected manner, the first user equipment selects the transmission resources on unlicensed band to perform sidelink communication, based on a priority or a delay requirement of sidelink data to be transmitted.

4. The electronic device according to claim 3, wherein if the number of failures in Listen Before Talk on the unlicensed band exceeds a threshold, the first user equipment changes to select the transmission resources on licensed band to perform sidelink communication.

5. The electronic device according to claim 2, wherein the processing circuitry is further configured to control the first user equipment to perform the sidelink communication with the second user equipment by transmitting information indicating a channel occupancy time of the unlicensed band resources to be occupied by the sidelink communication.

6. The electronic device according to claim 4, wherein the number of failures comprises a number of subframes for which Listen Before Talk fails within a previous time window having a predetermined length.

7. The electronic device according to claim 2, wherein the processing circuitry is further configured to control the first user equipment to perform the sidelink communication with the second user equipment by transmitting, through a Physical Downlink Control Channel (PDCCH), second indication information that identifies the unlicensed band resource for the sidelink communication.

8. The electronic device according to claim 1, wherein the first user equipment operates as a relay user equipment, and the second user equipment operates as a remote user equipment, wherein the remote user equipment receives information from the base station via the relay user equipment.

9. The electronic device according to claim 1, wherein the processing circuitry is further configured to control the first user equipment to perform the sidelink communication with the second user equipment by transmitting, to the first user equipment, zone configuration information that includes a zone identifier and unlicensed band resource enabled zone list to enable the first user equipment to select the unlicensed band resource based on a comparison of a current location and the zone configuration information.

10. A method performed by an electronic device configured to operate as a base station in a wireless communication network, the method comprising:
communicating with a first user equipment; and
controlling the first user equipment to perform a sidelink communication with a second user equipment if a condition for performing the sidelink communication by the first user equipment with the second user equipment is satisfied,
wherein controlling the first user equipment to perform the sidelink communication with the second user equipment is done by:
transmitting, to the first user equipment, first configuration information that identifies an acquisition manner of transmission resource,
wherein the first configuration information is included in a radio resource control (RRC) signaling and comprises one of a first value or a second value,
wherein the first value identifies that the acquisition manner is a base station scheduled manner where the transmission resource is scheduled by the base station to the first user equipment,
wherein the second value identifies that the acquisition manner is a user equipment selected manner where the first user equipment selects the transmission resource from a configured resource pool or a resource pool list; and
configuring, to the first user equipment, information identifying the configured resource pool or the resource pool list via the RRC signaling or a system information block (SIB).

11. An electronic device at a user equipment side in a wireless communication network, comprising:
a processing circuitry configured to:
acquire control information from a base station; and
perform a sidelink communication with another user equipment based on the control information if a condition for performing the sidelink communication by the first user equipment with the second user equipment is satisfied,
wherein the processing circuitry is configured to
receiving, from the base station, first configuration information that identifies an acquisition manner of transmission resource,
wherein the first configuration information is included in a radio resource control (RRC) signaling and comprises one of a first value or a second value,
wherein the first value identifies that the acquisition manner is a base station scheduled manner where the transmission resource is scheduled by the base station to the user equipment,
wherein the second value identifies that the acquisition manner is a user equipment selected manner where the user equipment selects the transmission resource from a configured resource pool or a resource pool list; and
acquiring, from the base station, information identifying the configured resource pool or the resource pool list via the RRC signaling or a system information block (SIB).

12. The electronic device according to claim 11, wherein in a case that the acquisition manner being the base station scheduled manner, the circuitry is configured to receive, from the base station, the transmission resources on unlicensed band scheduled by the base station based on a priority or a delay requirement of sidelink data, and perform the sidelink communication with the transmission resources on unlicensed band.

13. The electronic device according to claim 11, wherein the configured resource pool or the resource pool list comprises transmission resources on both of unlicensed band and licensed band, in a case that the acquisition manner being the user equipment selected manner, the circuitry is configured to select the transmission resources on unlicensed band to perform sidelink communication, based on a priority or a delay requirement of sidelink data to be transmitted.

14. The electronic device according to claim 13, wherein the circuitry is configured to conduct Listen Before Talk on the unlicensed band, if the number of failures in Listen Before Talk on the unlicensed band exceeds a threshold, the circuitry is configured to change to select the transmission resources on licensed band to perform sidelink communication.

15. The electronic device according to claim 13, wherein the processing circuitry is further configured to communicate with the base station on the unlicensed band, and to perform the sidelink communication with the second user equipment by sharing a channel occupancy time of the unlicensed band resources to be occupied by both the Uu link and the sidelink communication.

16. The electronic device according to claim 14, wherein the number of failures comprises a number of subframes for which Listen Before Talk fails within a previous time window having a predetermined length.

17. The electronic device according to claim 12, wherein the processing circuitry is further configured to receive, through a Physical Downlink Control Channel (PDCCH), second indication information that identifies the unlicensed band resource for the sidelink communication.

18. The electronic device according to claim 11, wherein the user equipment operates as a relay user equipment, and the other user equipment operates as a remote user equipment, wherein the remote user equipment receives information from the base station via the relay user equipment.

19. The electronic device according to claim 11, wherein the processing circuitry is further configured to receive zone configuration information that includes a zone identifier and unlicensed band resource enabled zone list to select the unlicensed band resource based on a comparison of a current location and the zone configuration information.

20. A method performed by an electronic device at a user equipment side in a wireless communication network, comprising:

acquiring control information from a base station; and
performing a sidelink communication with another user equipment based on the control information if a condition for performing the sidelink communication by the first user equipment with the second user equipment is satisfied,
wherein the method further comprises
receiving, from the base station, first configuration information that identifies an acquisition manner of transmission resource,
wherein the first configuration information is included in a radio resource control (RRC) signaling and comprises one of a first value or a second value,
wherein the first value identifies that the acquisition manner is a base station scheduled manner where the transmission resource is scheduled by the base station to the user equipment,
wherein the second value identifies that the acquisition manner is a user equipment selected manner where the user equipment selects the transmission resource from a configured resource pool or a resource pool list; and
acquiring, from the base station, information identifying the configured resource pool or the resource pool list via the RRC signaling or a system information block (SIB).

* * * * *